(12) United States Patent
Tashiro et al.

(10) Patent No.: US 8,514,414 B2
(45) Date of Patent: Aug. 20, 2013

(54) IMAGE FORMING APPARATUS AND INPUT OPERATING DEVICE FOR USE IN THE SAME HAVING A UNIVERSAL MODE IN WHICH LIMITED FUNCTIONS CAN BE SET WITH RECOGNITION HIGHER THAN IN A STANDARD MODE

(75) Inventors: Michiko Tashiro, Osaka (JP); Hiromi Sakata, Osaka (JP); Tetsuya Maeda, Osaka (JP); Miki Teshima, Sakai (JP); Dai Shigenobu, Osaka (JP)

(73) Assignee: Kyocera Mita Corporation (JP)

( * ) Notice: Subject to any disclaimer, the term of this patent is extended or adjusted under 35 U.S.C. 154(b) by 1212 days.

(21) Appl. No.: 11/712,005

(22) Filed: Feb. 28, 2007

(65) Prior Publication Data

US 2007/0201074 A1     Aug. 30, 2007

(30) Foreign Application Priority Data

Feb. 28, 2006  (JP) ................ 2006-052145
Feb. 28, 2006  (JP) ................ 2006-052146
Feb. 28, 2006  (JP) ................ 2006-052147
Feb. 28, 2006  (JP) ................ 2006-052148
Feb. 28, 2006  (JP) ................ 2006-052149

(51) Int. Cl.
*G06F 3/12* (2006.01)

(52) U.S. Cl.
USPC ............................. 358/1.13; 399/81

(58) Field of Classification Search
USPC ............... 358/1.13; 399/80, 81; 704/258; 726/16; 715/705, 769
See application file for complete search history.

(56) References Cited

U.S. PATENT DOCUMENTS

| | | | |
|---|---|---|---|
| 6,873,806 B2 | 3/2005 | Kobayashi et al. | |
| 7,683,907 B2 * | 3/2010 | Tashiro | 358/1.13 |
| 2003/0004983 A1 * | 1/2003 | Cohen | 707/500 |
| 2003/0020760 A1 * | 1/2003 | Takatsu et al. | 345/810 |
| 2003/0218642 A1 * | 11/2003 | Sakayori et al. | 345/853 |
| 2004/0081479 A1 * | 4/2004 | Kobayashi et al. | 399/80 |
| 2004/0098261 A1 * | 5/2004 | Kaneko et al. | 704/258 |
| 2005/0183141 A1 * | 8/2005 | Sawada | 726/16 |
| 2006/0171734 A1 * | 8/2006 | Maeda | 399/81 |
| 2006/0294464 A1 * | 12/2006 | Tokimoto et al. | 715/705 |
| 2007/0035523 A1 * | 2/2007 | Cohen | 345/169 |
| 2007/0101283 A1 * | 5/2007 | Miyamoto | 715/769 |

FOREIGN PATENT DOCUMENTS

| | | |
|---|---|---|
| JP | 62-272286 | 11/1987 |
| JP | 5-181337 | 7/1993 |
| JP | 6-59647 | 3/1994 |
| JP | 8-320775 | 12/1996 |

(Continued)

*Primary Examiner* — Twyler Haskins
*Assistant Examiner* — Nicholas Pachol
(74) *Attorney, Agent, or Firm* — Gerald E. Hespos; Michael J. Porco; Matthew T. Hespos

(57) ABSTRACT

To provide enhanced operability to users incapable of setting complicated operations such as handicapped people, children, and old people. An operation panel section displays a plurality of settable functions to receive an input of the plurality of the settable functions. An input controller switches an input mode through an operation panel section between a standard mode in which any function can be set and a universal mode in which limited functions can be set with visibility higher than the standard mode.

15 Claims, 15 Drawing Sheets

(56) References Cited

FOREIGN PATENT DOCUMENTS

| | | |
|---|---|---|
| JP | 9-139789 | 5/1997 |
| JP | 11-109794 | 4/1999 |
| JP | 200376475 | 3/2003 |
| JP | 2003-316211 | 11/2003 |
| JP | 2003-337505 | 11/2003 |
| JP | 2004-21561 | 1/2004 |
| JP | 2004-133182 | 4/2004 |
| JP | 2004-215181 | 7/2004 |
| JP | 2004-220092 | 8/2004 |
| JP | 2005-229588 | 8/2005 |
| JP | 2005-318563 | 11/2005 |
| JP | 2005-342951 | 12/2005 |

* cited by examiner

IMAGE FORMING APPARATUS AND INPUT OPERATING DEVICE FOR USE IN THE SAME HAVING A UNIVERSAL MODE IN WHICH LIMITED FUNCTIONS CAN BE SET WITH RECOGNITION HIGHER THAN IN A STANDARD MODE

BACKGROUND OF THE INVENTION

1. Field of the Invention

The present invention relates to an image forming apparatus such as a copying machine, and an input operating device for use in the same, and particularly to an image forming apparatus having a universal mode.

2. Description of the Related Art

In the case where a copying machine or an image forming apparatus capable of operating complicated functions such as a digital composite machine having a number of functions including copying functions, printing functions, and facsimile transmission functions is installed in a place where unspecified people come to use the apparatus, it has been demanded that the apparatus can be easily used by various users without impairing its high performance which is normally available. To satisfy this demand, in recent years, an apparatus having a standard mode and a universal mode is coming on the market.

The standard mode is intended for the user capable of coping with complicated operations such as non-handicapped people and young and middle-aged peoples. This mode enables the user to set all the functions provided in the apparatus through an input operating device thereof. On the other hand, the universal mode is intended for the user incapable of coping with complicated operations or being unfamiliar with the complicated operations, such as handicapped people, children, and high-aged people. This mode can, although limited to a smaller number of functions, display setting images in an enlarged size to enable the user to easily execute function setting.

For example, Japanese Unexamined Patent Publication No. 6-59647 discloses an image forming apparatus which can provide an enlargement display and enables the whole contents to be displayed in scroll in response to a scroll command by a shift key.

However, the enlargement display of this prior art shows a setting image which is merely an enlargement of the setting image of the standard mode, and requires the image scrolling to set a necessary function. Therefore, although improved visibility is provided by the enlargement display, there is the problem of having the difficulty of setting functions which are very frequently used by a simple operation.

Further, as the recent advancement in performance of office automation equipment, a display panel of a copying machine or a composite machine is colored in order to show increased amount of information as much as possible in a small-sized area. For this reason, in the prior art described above, although the enlargement display is easy to see, the people who have color-blindness and weak sight are likely to have an enlargement display represented by the color that they cannot recognize. Accordingly, for such handicapped people, it can be said that the visibility is not improved.

Further, in the prior art described above, an enlargement display is shown by actuating an enlargement key, and a normal display is shown by actuating the same key again. However, in image forming apparatus having multiple functions, such as a composite machine, it is difficult to display all the functions in the universal mode because of the fact that if high-level functions or rarely-used functions are allowed to be settable in the universal mode, the number of hierarchies increases, resulting in complicated setting operations or an increase in the development cost for user interface on the manufacture's side.

Therefore, it is a practical way to reduce the number of functions settable in the universal mode. In the prior art, accordingly, there arises a problem that a complicated operation is required when changing a function settable in the universal mode to a function settable only in the standard mode continuously.

Japanese Patent No. 3613410 and Japanese Unexamined Patent Publication No. SHO 62-272286 respectively disclose a technology that enables a skilled user to set necessary functions among many functions in a smaller number of steps. In these prior arts, in place of dividing a function selection display frame showing a hierarchy having many ranks into a plurality of sub-frames, names indicative of the functions are collectively displayed in a small frame, and are made to correspond to numbers. The user specifies the number by operating a ten key to select a desired function. In this manner, the user can set his/her desired functions without conducting the complicated page turning operation.

However, although these prior arts provide the improved operability using ten keys to select a function, such operation is adaptive only for the skilled users as described above, but are not suitable for the users whom the universal mode is directed due to the fact that all the functions are displayed in a single display frame.

SUMMARY OF THE INVENTION

An objective of the present invention is to provide an image forming apparatus and an input operating device which can provide the user with an improved operability for a universal mode.

According to an aspect of the present invention, an input operating device is used in an image forming apparatus, and comprises: an input operating section for displaying a plurality of settable functions, and receiving an input of a function by a user; and a control section for switching over a standard mode of allowing all of the functions to be set and a universal mode of allowing a part of the functions with recognition higher than the standard mode.

According to another aspect of the present invention, an image forming apparatus is provided with the above-mentioned input operating device.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS

Hereinafter, an embodiment of the present invention will be described with reference to the drawings. It should be noted that the following embodiment is merely an example embodying the present invention, and does not limits the technical scope of the present invention.

Figure 1:
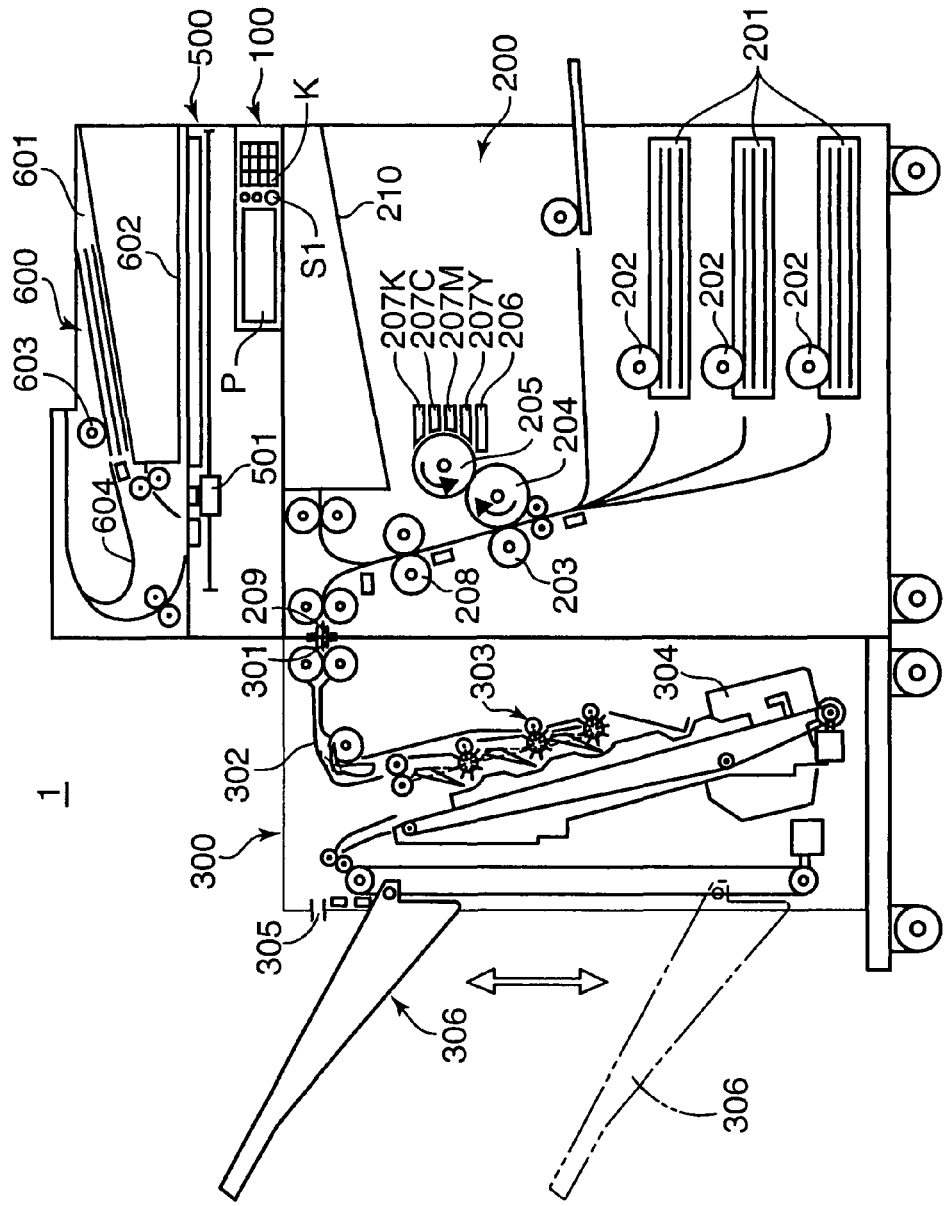
FIG. 1 is a vertical cross-sectional view showing a mechanical construction of a composite machine which is an image forming apparatus according to an embodiment of the present invention.

FIG. 1 is a vertical cross-sectional view showing a mechanical construction of a composite machine 1 which is an image forming apparatus according to an embodiment of the present invention. A composite machine is an image forming apparatus having a plurality of functions related to image formation such as copying function, printing function, facsimile function, and scanner function. The composite machine 1 roughly includes: an operating section 100 for allowing an user to input various operation commands; a main body section 200; a post treating section 300 located at the left side of the main body section 200; an original reading section 500 disposed over the main body section 200; and an original feeding section 600 disposed above the original reading section 500.

The main body section 200 includes a plurality of sheet supplying cassettes 201, a plurality of sheet supplying rollers 202, a transfer roller 203, an intermediate transfer roller 204, a photoconductive drum 205, an exposure device 206, developing devices 207Y, 207M, 207C, 207K for the colors of yellow, magenta, cyan, black, and a pair of fixing rollers 208, a discharge port 209, and a discharge tray 210.

The photoconductive drum 205 is uniformly charged by a charging device (not illustrated) while rotating in the direction shown by an arrow. The exposure device 206 converts a modulation signal generated based on image data on an original read in the original reading section 500 into a laser beam and outputs the resultant laser beam, so as to form electrostatic latent images on the photoconductive drum 205 in each of the colors. Developing particles of each of the colors are supplied to the photoconductive drum 205 from the developing devices 207Y, 207M, 207C, 207K to form respective toner images of the colors. Onto the intermediate transfer roller 204, the toner image in each color is transferred from the photoconductive drum 205 to form a colored toner image on the intermediate transfer roller 204.

On the other hand, the sheet supplying roller 202 withdraws a recording sheet from the sheet supplying cassettes containing the recording sheets, and feeds it to the transfer roller 203. The transfer roller 203 transfers the toner image formed on the intermediate transfer roller 204 to the conveyed recording sheet. The fixing roller 208 heats the transferred toner image to fix it onto the recording sheet. After that, the recording sheet is conveyed through the discharge port 209 of the main body section 200 into the post treating section 300. If necessary, the recording sheet is also discharged into the discharge tray 210.

The post treating section 300 includes a carrying-in port 301, a recording sheet conveying section 302, a sorting section 303, a processing section 304, a carrying-out port 305, and a stack tray 306. After the printing, the recording sheet which requires a post-processing such as stapling or punching is carried into the carrying-in port 301 through the discharge port 209 of the main body section 200. Each carried-in recording sheet is sequentially conveyed from the recording sheet conveying section 302 to the sorting section 303 where the recording sheets are properly sorted or the tops thereof are aligned with each other. After that, each recording sheet is processed such as stapled or punched in the processing section 304, and is discharged onto the stack tray 306 through the carrying-out port 305. The stack tray 306 is movable in upper and lower directions shown by the arrow in accordance with the number of the collected recording sheets carried out through the carrying-out port 305.

The original feeding section 600 includes an original placement section 601, an original discharging section 602, a feed roller 603, and an original conveying section 604. The original reading section 500 includes a scanner 501. The feed roller 603 dispenses the original set on the original placement section 601. The original conveying section 604 conveys dispensed originals onto the scanner 501 sequentially one by one. The scanner 501 sequentially reads the conveyed original. The original read by the scanner 501 are discharged onto the original discharging section 602.

Figure 2:
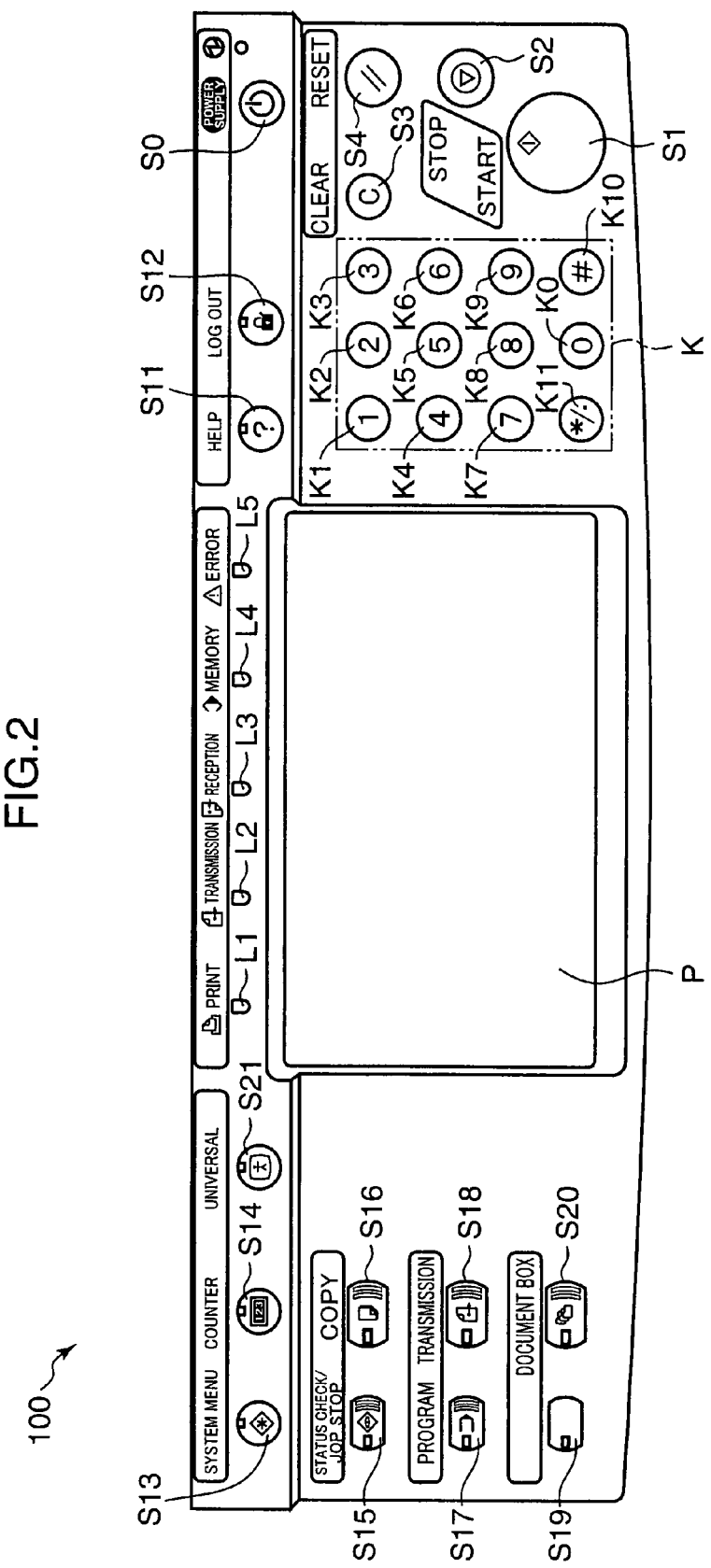
FIG. 2 is a front view of an operating section in the composite machine.

FIG. 2 is a front view of the operating section 100. The operating section 100 is provided with a touch panel device P, various switches S0 to S4, S11 to S21, a numeric input key group K and indicators L1 to L5. The touch panel device P serves as an input operating section, and includes a liquid crystal panel having a display area and a touch panel constituting an input section mounted on the liquid crystal panel. The liquid crystal panel is capable of full-color display. When the user touches a soft key displayed in a division on the liquid crystal panel, the liquid crystal panel recognizes the key as having been operated.

The numeric input key group K includes numeric keys K0 to K9 of numbers "0" to "9" collectively arranged as a group, and symbol keys K10 and K11 of "#" and "*". The numeric input key group K includes not only the numeric keys K0 to K9, but also the symbol keys K10 and K11 of "#" and "*". Also, the other symbol keys may be provided. Unlike the other switches S0 to S4 and S11 to S21, such keys should be arranged as a group collective with the numeric keys K0 to K9.

In the switches S0 to S4 and S11 to S21, typically, the switch S0 is a secondary power switch which is a power switch for a copying operation and a scanner reading operation. Besides the secondary power switch, the main body section 200 includes an unillustrated main power switch. If the main power switch is in an on state, even if the secondary power switch S0 is not operated, facsimile reception and printer data reception are enabled. The switch S1 is a start switch for starting a copying operation and a scanner reading operation. The switch S2 is a stop switch for stopping the copying operation and the scanner reading operation. The switch S3 is a clear switch for canceling an input operation. The switch S4 is a reset switch for resetting the touch panel device P to an initial state. It should be noted that, in this embodiment, there is provided a switch S21 for switching into a universal mode. The description of the universal mode in this embodiment which is operated by switching on the switch S21 will be made later in detail.

The indicators L1 to L5 include light emitting diodes, and indicate the state of the composite machine 1 in the light on/off state or flashing state. For example, the indicator L1 lights on during printing in a printer interlocked mode. The indicator L2 lights on during facsimile transmission. The indicator L3 lights on during facsimile reception. The indicator L4 lights on during waiting for facsimile transmission or during when the data before printing is stored. The indicator L5 lights on or flashes if a trouble occurs in anywhere in the composite machine 1.

Figure 3:
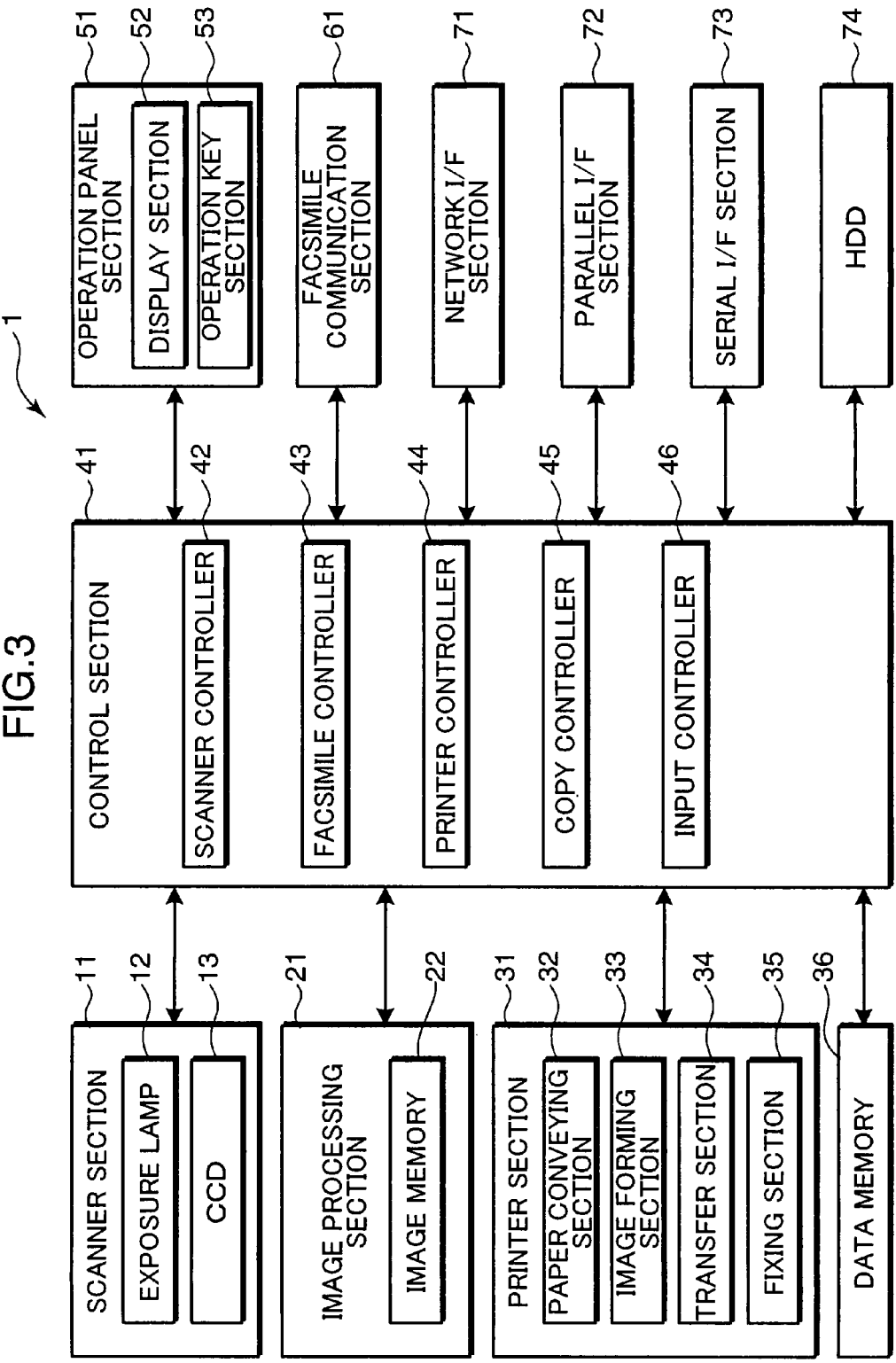
FIG. 3 is a block diagram showing an electric configuration of the composite machine.

FIG. 3 is a block diagram showing an electric configuration of the composite machine 1. The composite machine 1 roughly includes a scanner section 11, an image processing section 21, a printer section 31, a data memory 36, a control section 41, an operation panel section 51, a facsimile communicating section 61, a network I/F section 71, a parallel I/F section 72, a serial I/F section 73, and a hard disc drive 74. The scanner section 11, the image processing section 21, the data memory 36, the control section 41, the operation panel section 51, and the network I/F section 71 respectively correspond to the operating section 100, the original reading section 500, and the original feeding section 600 shown in FIG. 1. These sections realize a network scanner function for transmitting captured image data to the designated IP address. Further, the scanner section 11, the image processing section 21, the printer section 31, the data memory 36, the control section 41, the operation panel section 51, and the facsimile communicating section 61 respectively correspond to the main body section 200, the operating section 100, the original reading section 500, and the original feeding section 600 shown in FIG. 1. These sections realize a facsimile function. Further, the image processing section 21, the printer section 31, the control section 41, the operation panel section 51, the network I/F section 71, and the parallel I/F section 72 respectively correspond to the main body section 200 and the operating section 100 shown in FIG. 1. These sections realize a printing function. Further, the scanner section 11, the image processing section 21, the printer section 31, the control section 41, and the operation panel section 51 respectively correspond to the main body section 200, the post treating section 300, the operating section 100, the original reading section 500, and the original feeding section 600. They realize a copying function.

The operation panel section 51 is used to allow the user to make operations related to the copying function, printing function, facsimile function, and scanner function, as will be described later, and sends operation commands by the user to the control section 41. The operation panel 51 includes a display section 52 having the touch panel P and the indicators L1 to L5, and an operation key section 53 having the start switch S1 and the numeric input key group K.

The scanner section 11 optically acquires an image of the original to generate image data. The scanner section 11 includes an exposure lamp 12 and a charge coupling device (CCD) 13. The scanner section 11 irradiates the original by the exposure lamp 12 and receives its reflected light by the CCD 13 so as to read the image of the original, and outputs image data corresponding to the read image to the image processing section 21. The scanner section 11 may be capable of reading not only a monochrome original but also a colored original and a photograph original.

The image processing section 21 is to execute various kinds of image processings to image data. For example, the image processing section 21 executes various image processings (modifications) for the image data read by the scanner section 11, including predetermined correction processings such as level correction, $\gamma$-correction and the like, compression and expansion of the image data, scale up and down, and the like. The image processing section 21 includes an image memory 22, and stores the processed image data into the image memory 22 or outputs it to the printer section 31, the facsimile communication section 61, or the network I/F section 71, and the like.

The printer section 31 prints the image produced based on the image data of the original read by the scanner section 11, the image data received from the external personal computer via the network I/F section 71, and the image data of the facsimile data received by the facsimile communication section 61 from the external facsimile device. The printer section 31 includes a sheet conveying section 32 having the sheet supplying cassettes and the sheet supplying rollers 202, an image forming section 33 having the intermediate transfer roller 204, the photoconductive drum 205, the exposure device 206, and the developing devices 207Y, 207M, 207C, 207K, a transfer section 34 having the transfer roller 203, and a fixing section 35 having the pair of fixing rollers 208. The paper sheet conveying section 32 conveys a recording sheet to the image forming section 33. The image forming section 33 forms a toner image corresponding to the aforementioned image data. The transfer section 34 transfers a toner image onto the recording sheet. The fixing section 35 fixes a toner image onto a recording sheet so as to create an image.

The data memory 36 is a storing section that stores beforehand the names and facsimile numbers of the receivers/transmitters for exchanging the facsimile communication registered on abbreviated buttons. The data memory 36 also stores beforehand the IP addresses of the receivers of the transmission at the time when the data memory 36 is used as a network scanner. These stored contents are properly rewritable by the control section 41 through an input operation on the operation panel section 51.

The control section 41 includes peripheral devices such as an electronically erasable and programmable read only memory (EEPROM) for storing programs specifying operations of an unillustrated central processing unit (CPU) into the CPU, a read-only memory (ROM), a random access memory (RAM) for temporarily storing data, a non-volatile storing section, and the like. Using these peripheral devices, the control section 41 controls the entire composite machine 1 in response to the instruction information received by the operation panel section 51 and the like or the detection signal supplied from the sensors disposed on individual locations in the composite machine 1.

More specifically, the control section 41 functions as a scanner controller 42, a facsimile controller 43, a printer controller 44, a copy controller 45, and an input controller 46.

The program may be provided through a recording medium such as a ROM CD-ROM, or the like, or may by provided through a transmission medium such as a network connected to the network I/F section 71. The transmission medium is not limited to a wired transmission medium, but may be a wireless transmission medium. Further, examples of the transmission medium also include not only communication lines but also a relay device for relaying communication lines, for example, a communication link such as a router.

In the case where the program is provided through a ROM, the ROM having the program recorded thereon is placed in the control section 41 to enable the CPU to execute the program. In the case where the program is provided through a CD-ROM, the CD-ROM reading device is connected to, for example, the parallel I/F section 72 to transmit the program to an EEPROM, so as to enable the CPU to execute the program. In the case where the program is provided through a transmission medium, the program received through the network I/F section 71 is transferred to the EEPROM to enable the CPU to execute the program.

The scanner controller 42 controls the operation of individual sections to be used for realizing the scanner function. The facsimile controller 43 controls the operation of individual sections to be used for realizing the facsimile function. The printer controller 44 controls the operation of individual sections to be used for realizing the printing function. The copy controller 45 controls the operation of individual sections to be used for realizing the copying function.

The facsimile communication section 61 includes an encoding/decoding section (not shown), a modulating and demodulating section (not shown), and a network control unit (NCU) (not shown). The facsimile communication section 61 transmits image data of the original read by the scanner section 11 to another facsimile device via a telephone line or an internet line, or receives image data transmitted from another facsimile device. The encoding/decoding section compresses and encodes the image data to be transmitted, and expands and decodes the received image data. The modulating/demodulating section modulates the compressed and encoded image data into a sound signal, or demodulates the received signal (sound signal) into image data. Further the NCU controls the connection via a telephone line established with the facsimile device as a transmission receiver/transmitter.

The network I/F section 71 controls various data transmission and reception with the user-side server connected via a network, using a network interface (for example, 10/100 Base-Tx) and the like. In the case where one or more terminal devices such as personal computers are connected to the network, the network I/F section 71 controls various data transmission and reception with these terminal devices. For example, the network I/F section 71 transmits the original image data read by the scanner section 11 to terminal devices or receives the image data transmitted from terminal devices for the purpose of printing by the printer section 31.

The parallel I/F section 72 receives print data from an external device by parallel transmission that transmits data in the unit of plural bits using plural signal lines, using a high-speed bidirectional parallel interface (for example, conforming to IEEE1284). The serial I/F section 73 receives various data from an external device by serial transmission that sequentially sends data one by one bit using a single signal line, using a serial interface (for example, RS-232C).

The HDD 74 is a detachable storing medium which is optionally added, and stores the image data read by the scanner section 11 or the image data transmitted via the network, or the output format set in the image data. The provision of the HDD 74 enables to read an original without interlocking with a print output or to read a large number of originals continuously. The image data stored in the HDD 74 is used not only in the composite machine 1 but also is checked by a terminal device via the network I/F section 71 or is transmitted to a predetermined folder of the terminal device.

In the composite machine 1, various another functions can be realized by combining functions described above. For example, the scanner function may be proceeded to a PC transmitting function, E-mail transmitting function, a facsimile transmitting function, and the like. Here, the PC transmitting function is a function of directly transmitting image data of an original to a desired terminal device via a network. The E-mail transmitting function is a function of transmitting image data of an original as a file attached to an electronic mail. Specifically, image data of an original is attached to an electronic mail and is directly transmitted to an unillustrated SMTP server via a network, and is further transmitted to a desired external terminal device from this SMTP server via a network. The facsimile transmitting function is a function of directly transmitting image data of an original to a desired facsimile device via a telephone line.

Hereinafter, an inputting method (manner) according to the embodiment of the present invention by means of the input controller 46 of the control section 41 using the operating section 100. In this embodiment, the inputting manner includes two modes: a standard mode directed for users capable of coping with complicated operations such as non-handicapped people and young and middle-aged people; and a universal mode directed for users incapable of coping with complicated operations such as handicapped people, children, and high-aged people. An input operation is made by switching these modes. The input operating device includes the input controller 46 of the control section 41 which is the control section, and the touch panel device P which is the input operating section.

Figure 4:
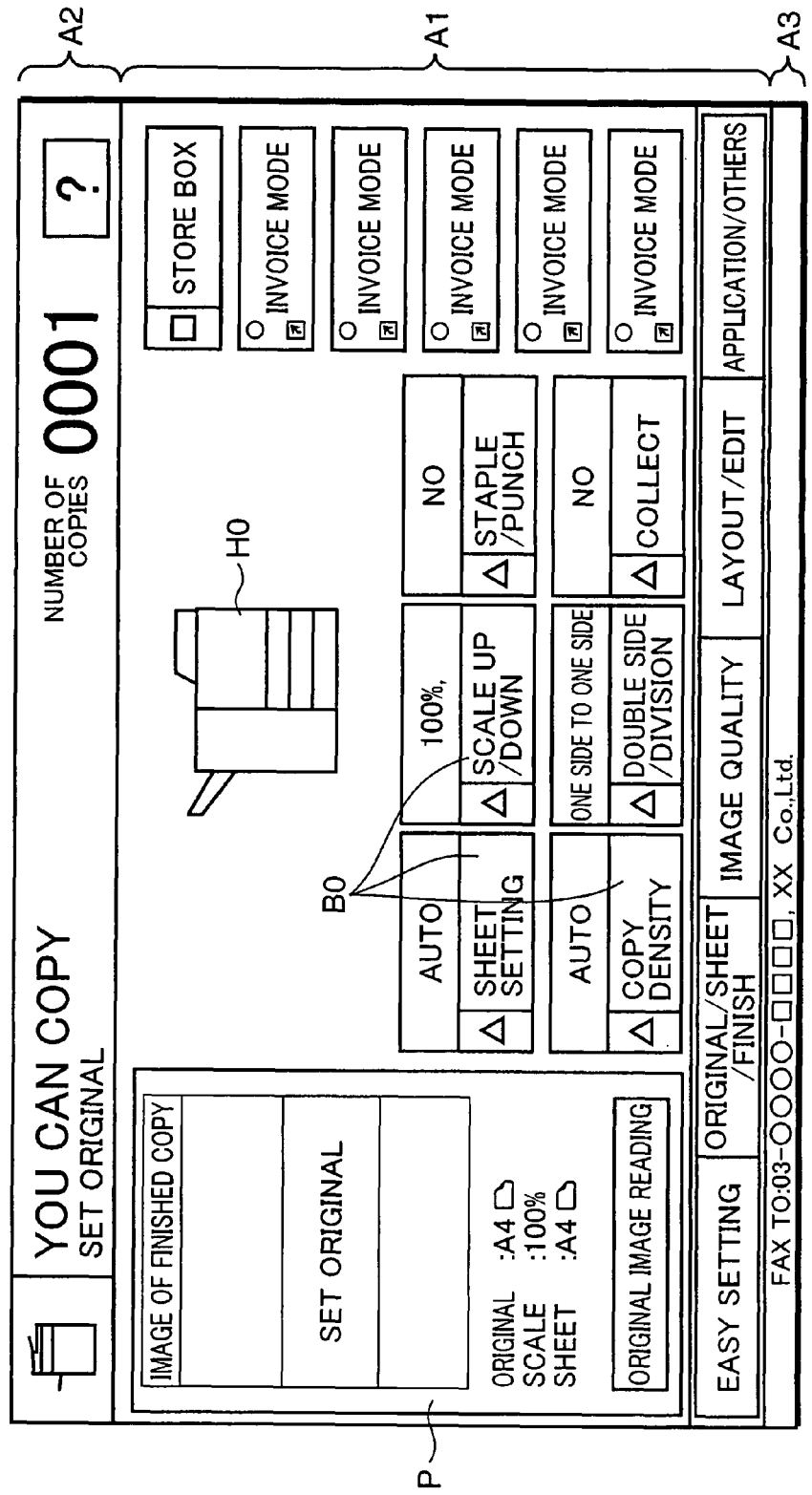
FIG. 4 is an illustration showing an exemplary initial reception display frame in a standard mode.

FIG. 4 is an illustration showing an exemplary initial reception frame in the standard mode. As shown in FIG. 4, in a display area A1 in the initial reception frame in the standard mode, an outline figure H0 of the composite machine 1, various software keys B0, and the like are displayed in full colors. In a display area A2, guidance information is displayed in full colors. In a display area A3, status information is displayed in full colors. In the example shown in FIG. 4, the outline figure H0 illustrates that the optionally mounted plurality of sheet supplying cassettes 201, the post treating section 300, the original reading section 50, and the original feeding section 600 are attached to the main body section 200. The basic functions of the copying machine are allocated to the software keys B0. Further, the display area A2 also displays guidance information indicating that no trouble occurs in the copying machine and a copying operation is workable, and "1" is set as an initial number for the number of copies. The display area A3 displays status information indicating that facsimile is now being transmitted. This embodiment is characterized in the universal mode and the switching between the modes as will be described hereinafter in detail. The display frame in the standard mode is similar to that of the conventional machine, and will be briefly described.

In this state, when a number is inputted by way of the numeric keys K0 to K9 in the numeric input key group K, the number of copies is set and the guidance display changes. Then, an original is set and the start switch S1 is operated, so that the copying operation is repeatedly performed to complete the set number of copies. When a software key B0 is operated in the state shown in FIG. 4, the display area A2 switches into a display frame for setting more specific instruction in the next rack of the hierarchy of the function corresponding to the operated key B0.

The operation of accepting the input operation as described above is realized when the input controller 46 of the control section 41 recognizes the operation made through the software keys B0 disposed on the touch panel device P, the switches S0 to S4, S11 to S21, or the numeric input key groups K. In response to the input, the application controllers 42 to 45 of the control section 41 operate. Further, the input controller 46 reads image data stored in the data memory 36, and controls the touch panel device P and the indicators L1 to L5 to display the next function setting display frame and the like. Similarly, the function setting display frame according to this embodiment described hereinafter is also changed when the input controller 46 of the control section 41 recognizes the operation made through a software key B0 disposed on the touch panel device P, the switches S0 to S4, S11 to S21, or the numeric input key group K, so as to read image data stored in the data memory 36.

Figure 5:
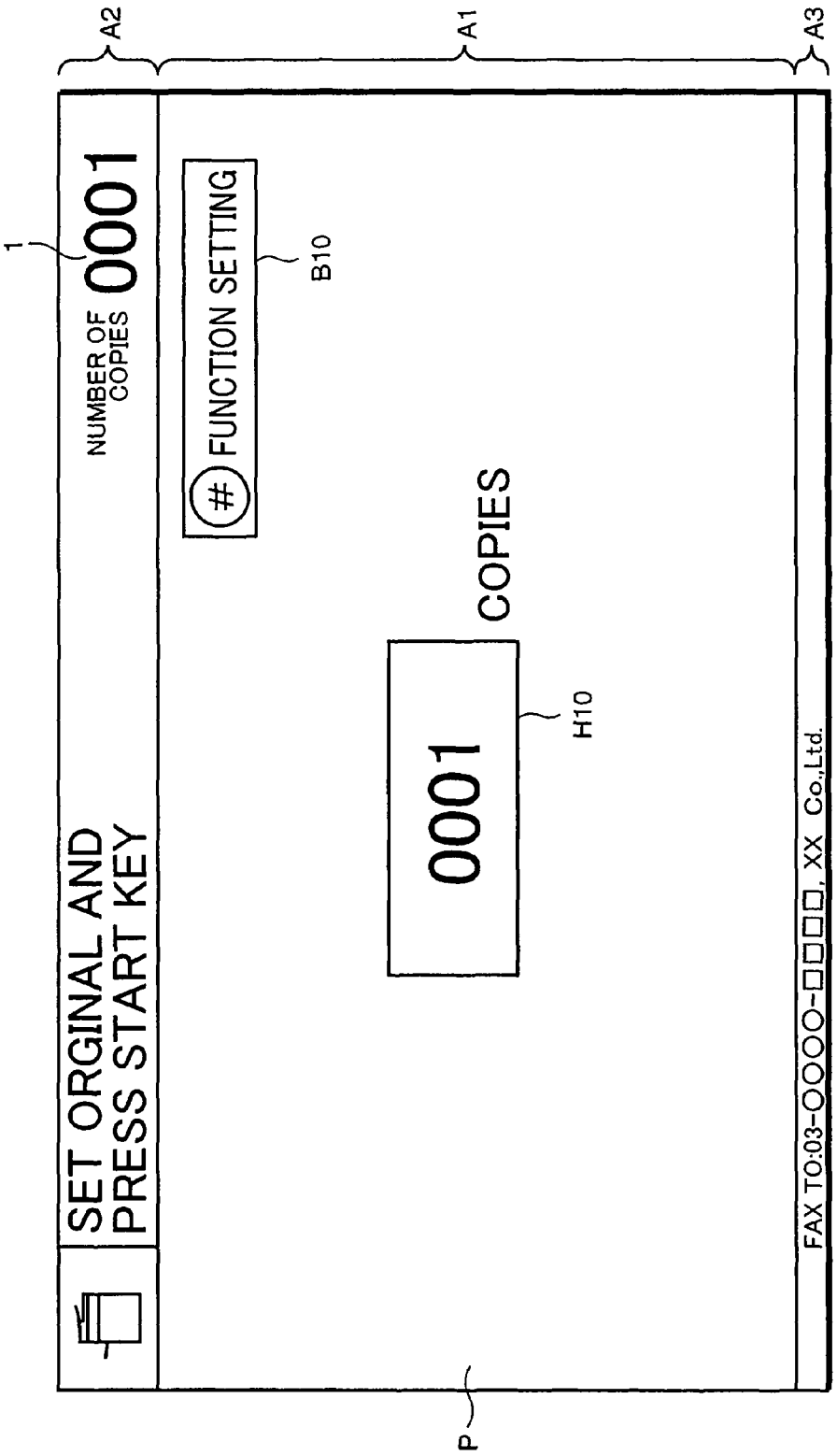
FIG. 5 is an illustration showing an exemplary initial display frame for the copying operation in a universal mode for setting the number of copies.

On the initial reception display frame in the standard mode shown in FIG. 4, when the switch S21 is operated, the display frame changes into a universal mode display frame, and as shown in FIG. 5, the contents of the display in the display area A1 changes. FIG. 5 is an illustration showing an exemplary display frame for setting the number of copies, which is an initial display frame in the universal mode for the copying operation. In this embodiment, when the display frame changes into the universal mode display frame, the display area A1 displays in monochrome and in contrast higher than that of the standard mode. Further, the display area A1 exhibits a set number of copies at a set number display box H10 in such a manner that only the number of copies is preferentially set first of all, and allows the input through numeric keys K0 to K9 of the numeric input key group K. When a number is inputted, the number of copies is set and the number in the set number display box H10 changes. When an original is set and the start switch S1 is operated, the copying operation is performed to produce the set number of copies. At this time, the set number of copies is continuously displayed in color as guidance information in the display area A2. On the other hand, the display area A1 exhibits the set number of copies in monochrome as described above and in contract higher than that of the standard mode. In addition, the set number of copies is displayed in an enlarged size substantially at the center position of the display area A1. Further, the status information in the display area A3 is also displayed in color as it is, and the same display is continued as far as the status is unchanged.

Figure 6:
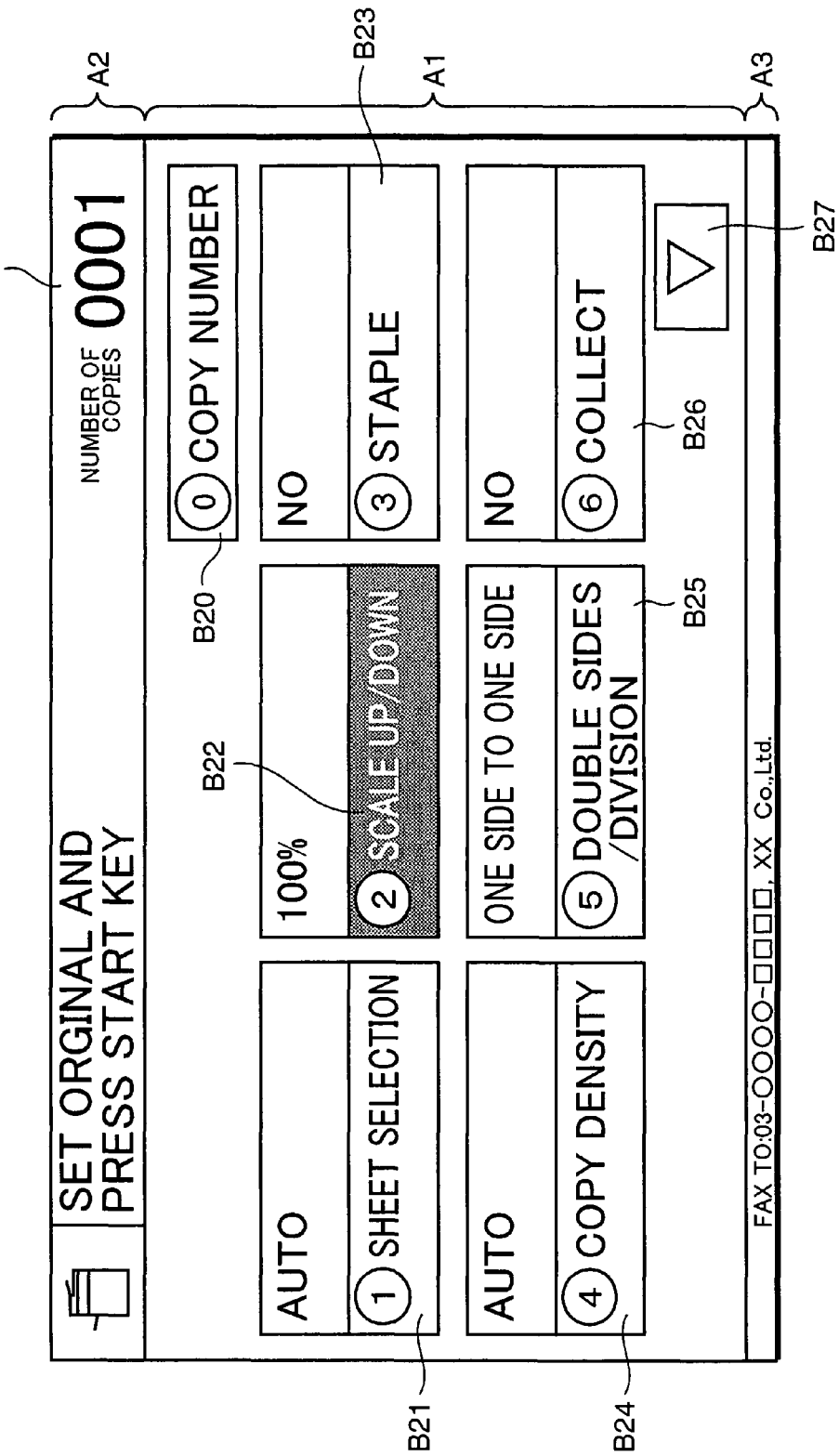
FIG. 6 is an illustration showing an exemplary function setting display frame for the copying operation in the universal mode.

Further, on the initial display frame in the universal mode, the set number display box H10 displays only the set number of copies in an enlarged size, and also displays software key B10 for setting other functions. The software key B10 is given with the symbol "#". When this software key B10 is operated, or the symbol key K10 given with "#" in the numeric input key group K is operated, a function selection display frame for selecting another function shown in FIG. 6 is displayed. FIG. 6 is an illustration showing an exemplary function setting display frame in the universal mode for copying operation. On the initial display frame in the universal mode shown in FIG. 5, the symbol key K10 of "#" is allocated to the software key B10 for shifting to function setting other than the function of setting the number of copies, accordingly assuring an input without confusing with setting the number of copies by the way of numeric keys K0 to K9. It is sufficient that a symbol key other than the numeric keys K0 to K9 in the numeric input key group K corresponds to the software key B10. In the example shown in FIG. 2, the symbol key K11 of "*" may be alternatively allocated to the software key B10.

Also, on the function selection display frame shown in FIG. 6, the universal mode continues. Thus, the display area A1 displays in monochrome and in contrast higher than that of the standard mode. In addition, the individual software keys B20 to B27 are assigned with the numbers corresponding to the numeric keys K0 to K7. On the function selection display frame shown in FIG. 6, when the software key B20 for setting the number of copies or the numeric key K0 corresponding to the software key B20 is operated, the display frame returns to the set number display frame shown in FIG. 5 described above. When the software keys B21 to B26 or the numeric keys K1 to K6 corresponding thereto are operated, the display frame shifts to the display frame for setting the individually corresponding functions. On the function selection display frame shown in FIG. 6, even if the reset switch S4 is operated, the display frame returns to the set number display frame.

There are nine settable functions as follows: sheet selection allocated to the software key B21 and the numeric key K1; selection of scale up/down allocated to the software key B22 and the numeric key K2; selection of stapling/punching allocated to the software key B23 and the numeric key K3; selection of copy density allocated to the software key B24 and the numeric key K4; the selection of double-sides/division allocated to the software key B25 and the numeric key K5; selection of collection allocated to the software key B26 and the numeric key K6; selection of sorting/assorting illustrated in FIG. 6; selection of image quality of an original; and selection of the size of original. FIG. 6 shows a state where scale up/down is selected immediately before shifting to the function selection display frame of the scale up/down in the next rank of the hierarchy.

On the function selection display frame shown in FIG. 6, in order to enlarge the software keys, three software keys, specifically, the selection of sorting/assorting, selection of image quality of an original, and selection of size of original are not displayed. In stead, the software key B27 for switching the display frame is displayed in the form of a downward arrow. When the software key B27 or the numeric key K7 is operated, these software keys are displayed, resulting in the software key for switching the display frame displayed in the form of an upward arrow. When the software key for switching the display frame or the corresponding numeric key is operated, the display frame returns to the function selection display frame shown in FIG. 6.

Figure 7:
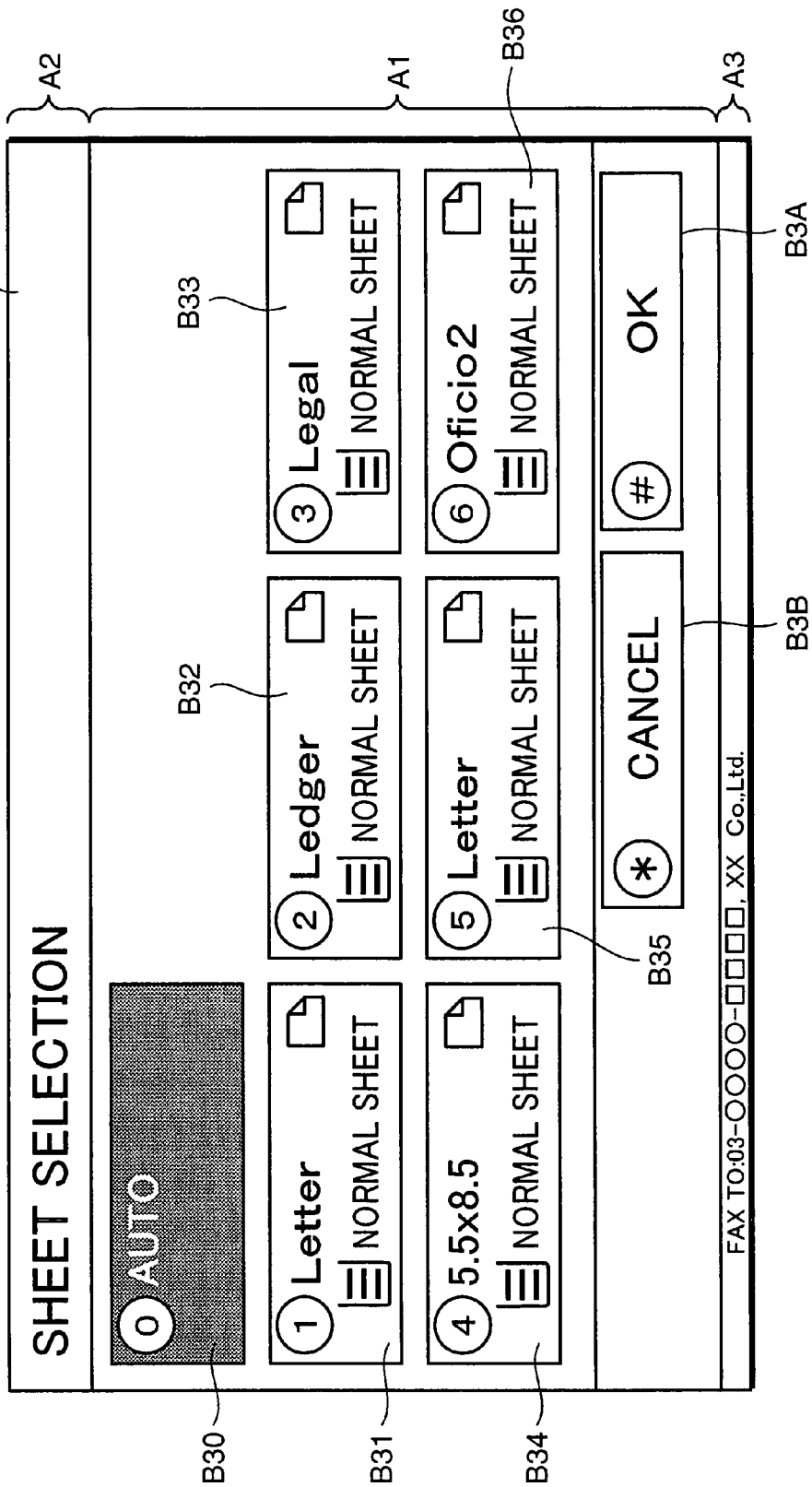
FIG. 7 is an illustration showing another exemplary function setting display frame for the copying operation in the universal mode.

On the function selection display frame shown in FIG. 6, when the software key B21 or the numeric key K1 is operated for example, the display frame shifts to the function selection display frame in the next rank of the hierarchy as if pages are turned, and the paper selecting display frame such as shown in FIG. 7 appears. FIG. 7 is an illustration showing another exemplary function setting display frame (sheet selecting display frame) in the universal mode for the copying operation. On the sheet selecting display frame, it is displayed in the display area A2 in color as guidance information that this is a sheet selecting display frame. The status information in the display area A3 is also displayed in color as it is. The same display continues as far as the status is unchanged. On the other hand, the display area A1 appears in monochrome as described above and in contrast higher than that of the standard mode. The display area A1 exhibits software keys B30 to B36 assigned with the numbers corresponding to the numeric keys K0 to K6, and displays software keys B3A and B3B assigned with symbols "#" and "*" corresponding to the symbol keys K10 and K11.

By operating the software key B30 or the numeric key K0, a sheet is automatically selected. By operating the software keys B31 to B36 or the numeric keys K1 to K6, the sheet in the displayed size is manually selected. By operating the software key B3A or the symbol key K10, the selection is fixed and the state automatically returns to one previous rank of the hierarchy (the function selection display frame shown in FIG. 6). By operating the software key B3B or the symbol key K11, the selection made through the software keys B30 to B36 or the numeric keys K0 to K6 is cancelled. FIG. 7 shows a state where automatic selection is selected.

Figure 8:
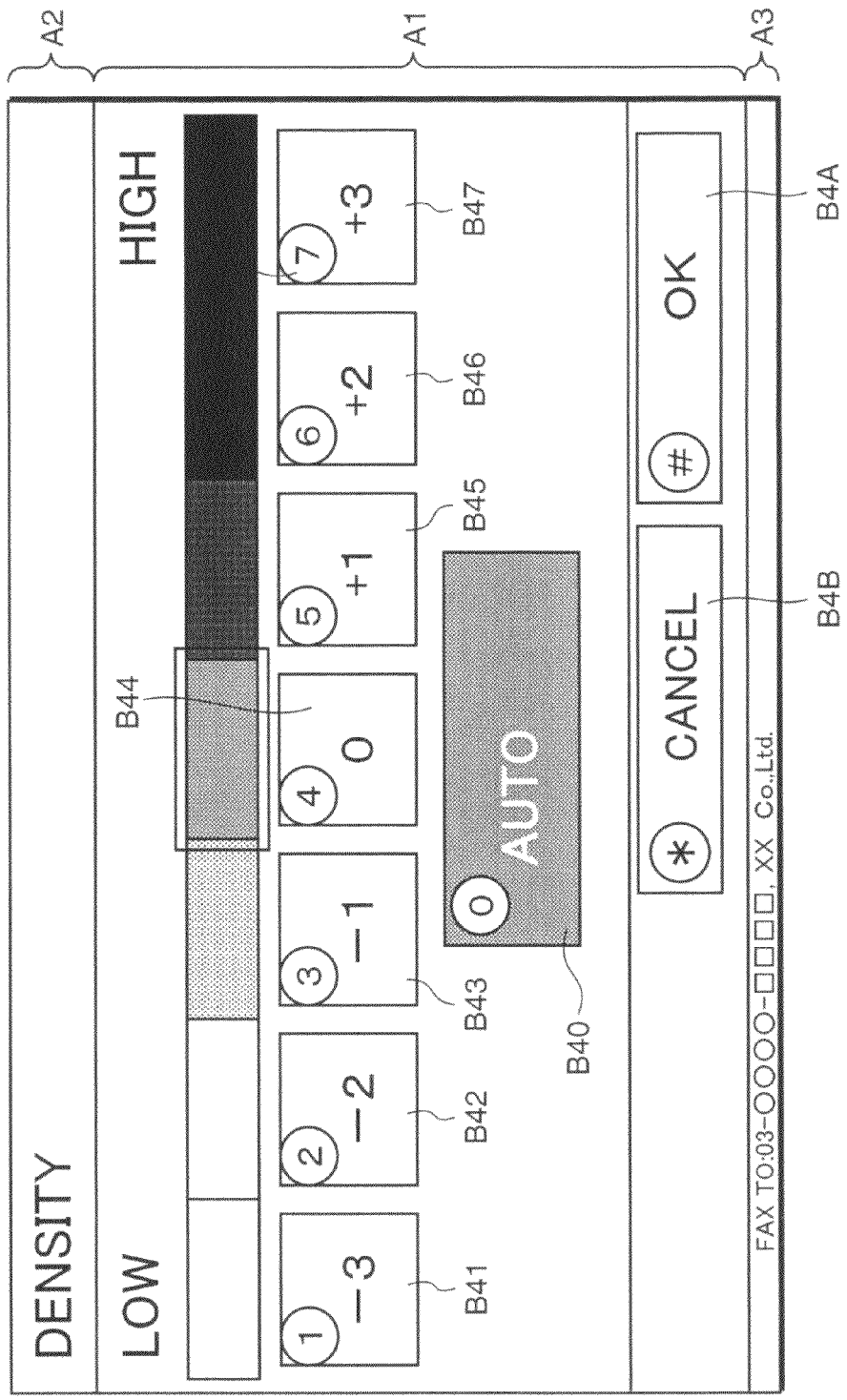
FIG. 8 is an illustration showing still another exemplary function setting display frame for the copying operation in the universal mode.

Further, on the function selection display frame shown in FIG. 6, when the software key B24 or the numeric key K4 is operated, a density selection display frame such as shown in FIG. 8 appears. FIG. 8 is an illustration showing another exemplary function setting display frame (density selection display frame) in the universal mode for the copying operation. On the density selection display frame, it is displayed in the display area A2 in color as guidance information that this is a density selection display frame. The status information in the display area A3 is also displayed in color as it is. The same display continues as far as the status is unchanged. On the other hand, the display area A1 appears in monochrome as described above and in contrast higher than that of the standard mode. The display area A1 exhibits software keys B40 to B47 assigned with the numbers corresponding to the numeric keys K0 to K7, and displays software keys B4A and B4B assigned with symbols "#" and "*" corresponding to the symbol keys K10 and K11.

By operating the software key B40 or the numeric key K0, the density is automatically selected. By operating the software keys B41 to B47 or the numeric keys K1 to K7, the density is manually selected to the currently displayed density. By operating the software key B4A or the symbol key K10, the selection is fixed and the state automatically returns to one previous rank of the hierarchy (the function selection display frame shown in FIG. 6). By operating the software key B4B or the symbol key K11, the selection made through the software keys B40 to B47 or the numeric keys K0 to K7 is cancelled. FIG. 8 shows a state where a density at a middle level is selected. An up/down key is used as a software key for selecting the density, and the density may be set by repeatedly operating the up/down key.

In this embodiment, the facsimile operation and the copying operation are expected to be utilized by many users, and can be used through only simple functions. Therefore, the universal mode is prepared for these operations. These operations can be switched to each other with the universal mode unchanged. Contrarily, other operations requiring complicated operations are not supported by the universal mode.

Figure 9:
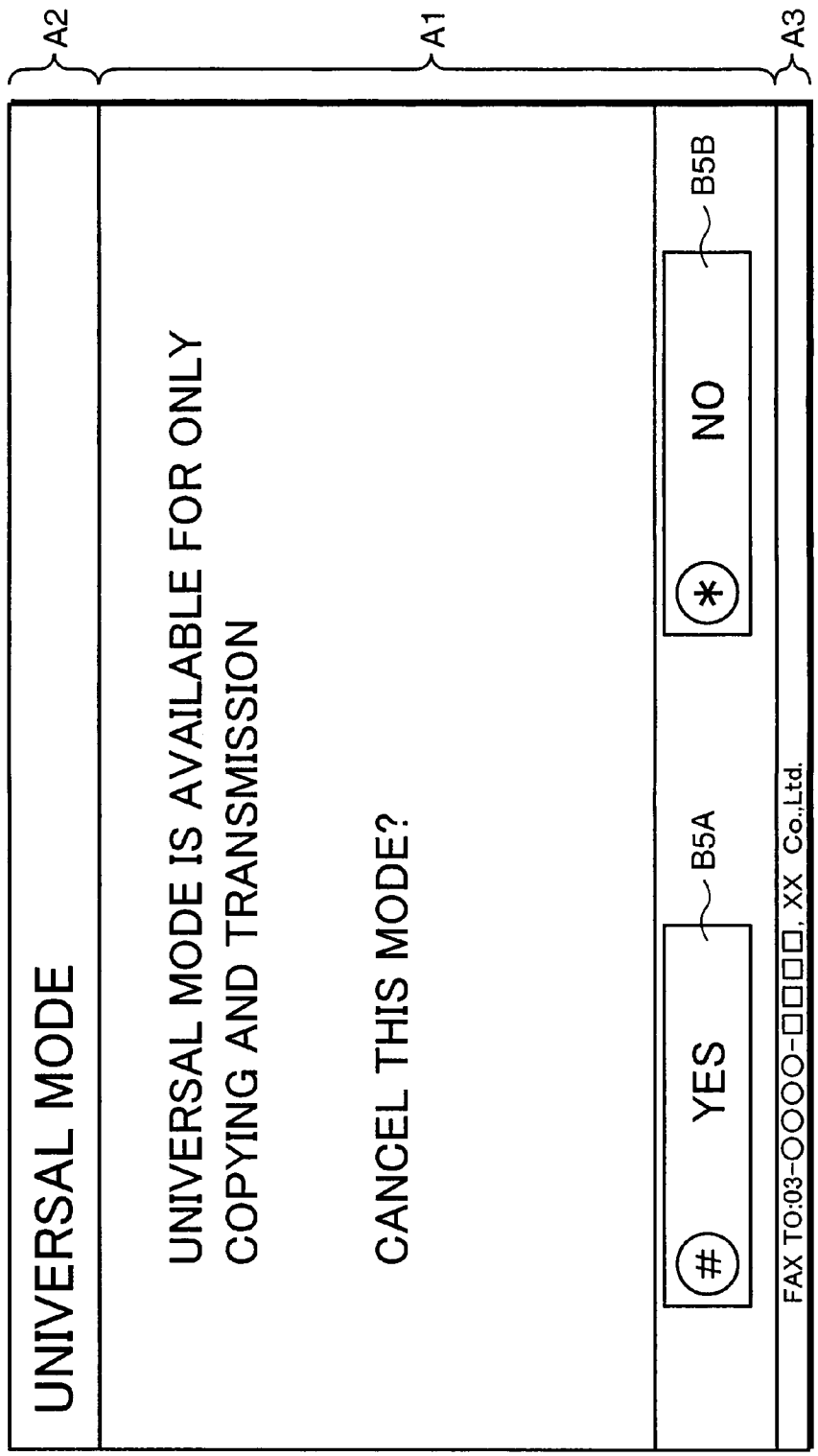
FIG. 9 is an illustration showing an exemplary confirmation display frame in the universal mode.

Therefore, when a desired function selection display frame for the copying operation in the universal mode is displayed or when the user desires an operation other than these operations, for example, when the switch S20 in the box function is operated, a confirmation (warning) display frame to the user is displayed such as shown in FIG. 9. FIG. 9 is an illustration showing an exemplary confirmation display frame in the universal mode. After confirming to the user on this confirmation display frame that he/she accepts the shift to another operation, the input controller 46 determines whether or not to switch the universal mode into the standard mode so as to shift to another operation in the standard mode, or to continue the transmitting operation or the copying operation with the universal mode unchanged. That is, the input controller 46 determines whether "Yes" has been selected by operating the software key B5A or the symbol key K10 on the inquiry display frame shown in FIG. 9, or "No" has been selected by operating the software key B5B or the symbol key K11. When the software key B5A or the symbol key K10 has been operated, the input controller 46 switches the universal mode into the standard mode. Contrarily, when the software key B5B or the symbol key K11 has been operated, the function setting display frame before the confirmation display frame is displayed is displayed through the control by the input controller 46.

Figure 10:
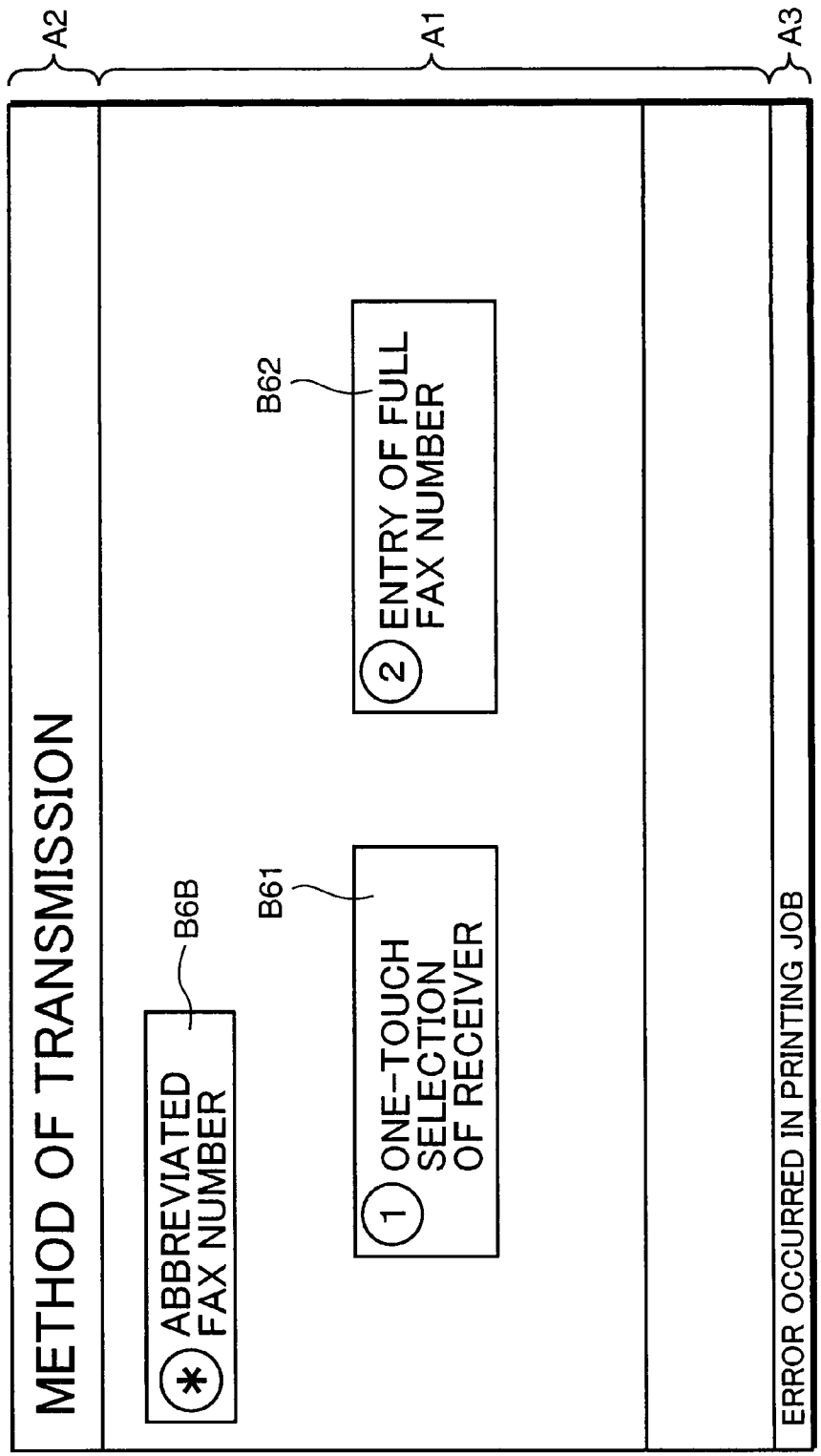
FIG. 10 is an illustration showing an initial display frame for facsimile transmission operation in the universal mode which is a function selection display frame to determine a way of selecting a transmission receiver.

On the other hand, when a desired function selection display frame in the universal mode or after the copying operation has been finished, if the transmission switch S18 is operated, the function being set is cancelled and the facsimile transmission operation is entered with the universal mode unchanged. As a result, the function selection display frame as shown in FIG. 10 is displayed. Also, when the transmission switch S18 is operated during the reception state such as shown in FIG. 4 and further, the switch S21 in the universal mode is operated, the facsimile transmission operation results in switching into the universal mode. As a result, the function selection display frame shown in FIG. 10 is displayed.

FIG. 10 is an initial display frame for the facsimile transmission operation in the universal mode, and is an illustration showing an exemplary function selection display frame for determining a way of selecting a transmission receiver. The function selection display frame shown in FIG. 10 displays three selection ways, that is, contact to the receiver by abbreviated number corresponding to the software key B6B and the symbol key K11, direct contact to the registered receiver corresponding to the software key B61 and the numeric key K1, and direct input of the facsimile number corresponding to the software key B22 and the numeric key K2. The display area A3 for the status information shown in FIG. 10 displays that an error has occurred during the print job.

Figure 11:
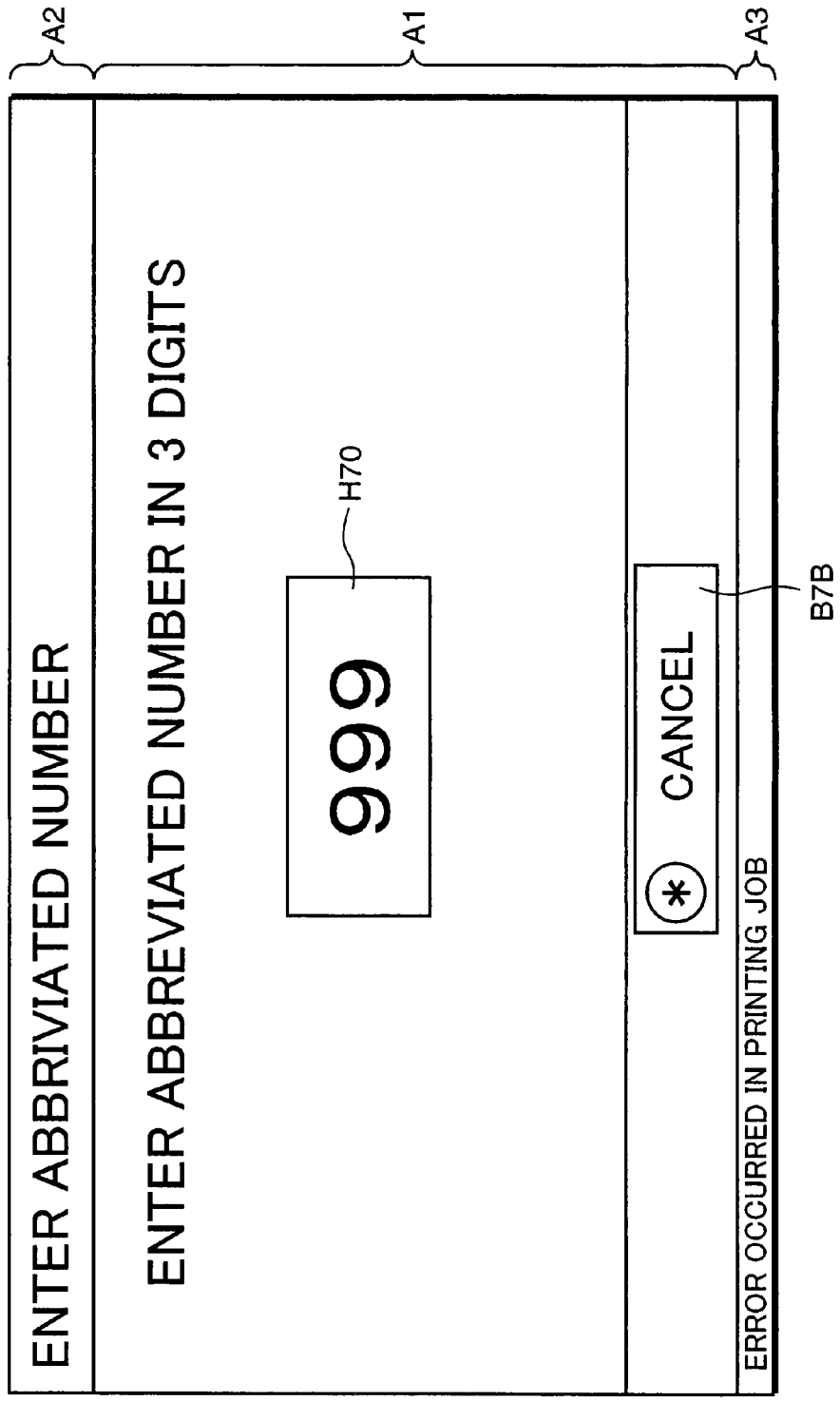
FIG. 11 is an illustration showing an exemplary function setting display frame for facsimile transmission operation in the universal mode.

On the function selection display frame shown in FIG. 10, when the software key B6B or the symbol key K11 is operated, the display frame shifts to the function selection display frame in the next rank of the hierarchy, where an abbreviated number inputting display frame shown in FIG. 11 appears. FIG. 11 is an illustration showing an exemplary function setting display frame (abbreviated number inputting display frame) for the facsimile transmission operation in the universal mode. The abbreviated number inputting display frame shown in FIG. 11 displays an abbreviated number display box H70 for displaying an abbreviated number inputted through the numeric keys K0 to K9 in an enlarged size as well as a software key B7B for canceling the input.

Figure 12:
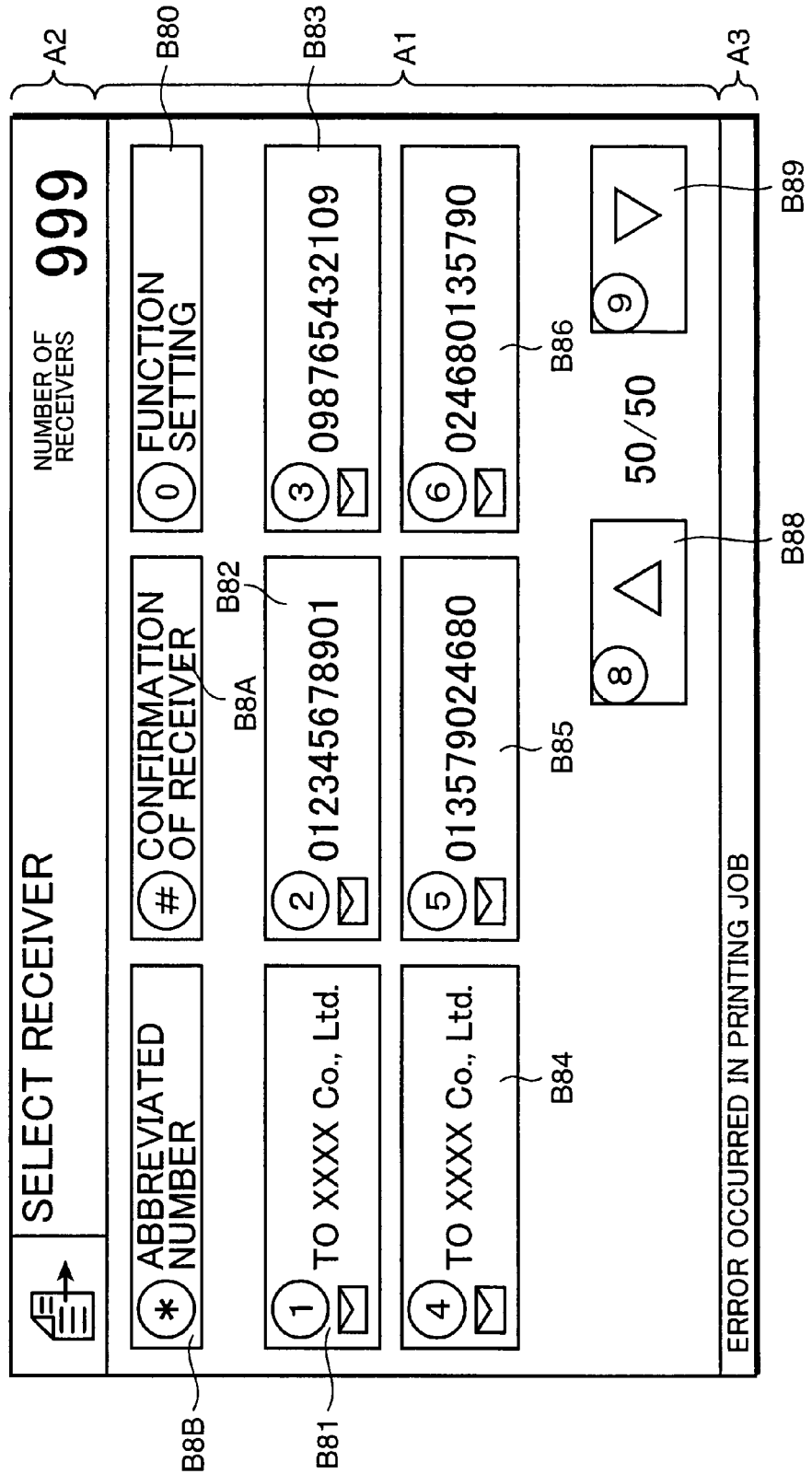
FIG. 12 is an illustration showing another exemplary function setting display frame for facsimile transmission operation in the universal mode.

Contrary to the above, when the software key B61 or the numeric key K1 is operated on the function selection display frame shown in FIG. 10, the display frame shifts to the function selection display frame in the next rank of the hierarchy where a registered receiver contact display frame for directly contacting to the receiver registered beforehand as shown in FIG. 12. FIG. 12 is an illustration showing another exemplary function setting display frame (registered receiver contact display frame) for facsimile transmission operation in the universal mode. The registered receiver contact display frame shown in FIG. 12 displays the names and telephone numbers of individual registered receivers corresponding to the software keys B81 to B86 and the numeric keys K1 to K6, an up/down key for turning the pages on the registered receiver contact display frame corresponding to the software keys B88 and B89 and the numeric keys K8 and K9, a switch key corresponding to the software key B8B and the symbol key K11, for switching the display frame into the abbreviated number inputting display frame shown in FIG. 11, a switch key corresponding to the software key B8A and the symbol key K10, for switching the display frame into a confirmation display frame for confirming the selected receiver, and a switch key corresponding to the software key B80 and the numeric key K0, for switching the display frame into a detail setting display frame.

Here, the software keys are displayed within the number of the individual keys K0 to K11 in the numeric input key group K, that is, in the example illustrated in FIG. 2, twelve software keys are displayed at the maximum. Therefore, if keys are provided in addition to the numeric input key group K, these keys may be included. In the example shown in FIG. 12, no software key corresponded to the numeric key K7 is provided in consideration of the display frame balance, software keys corresponding to all the remaining keys K0 to K6, K8 to K11 other than the key K7 are provided. As a result of this arrangement, on the individual-function selection display frame, the individual software keys (selected functions) result in having their corresponded keys. This enables easy operation of the key corresponding to the selectable function. In addition, each selectable function may be displayed in a large size, thereby improving the operability. On the other hand, as shown in FIGS. 5 and 11, if it is required to input using the numeric keys K0 to K9, the software keys are set only within the number of the symbol keys K10 and K11.

Figure 13:
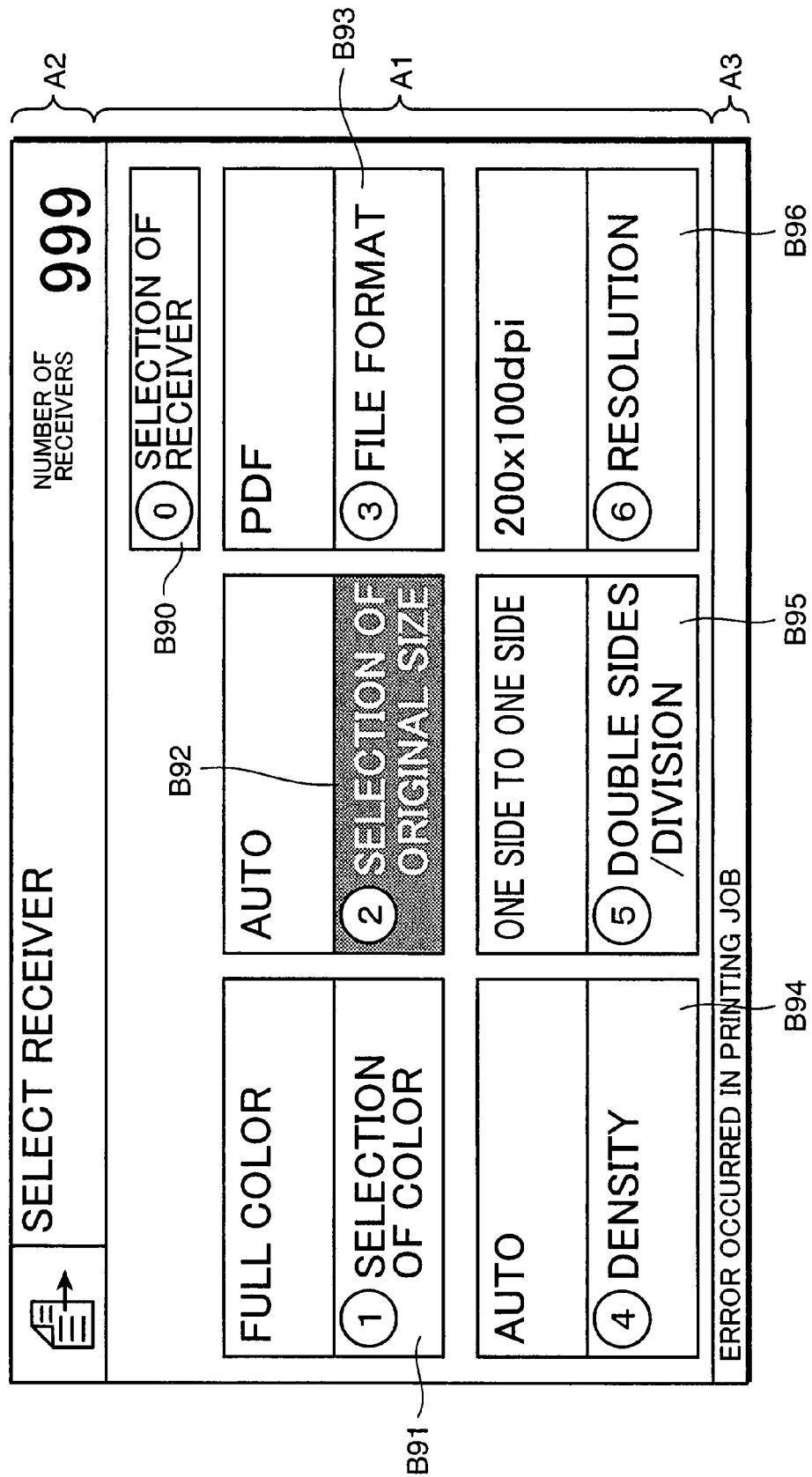
FIG. 13 is an illustration showing still another exemplary function setting display frame for facsimile transmission operation in the universal mode.

On the registered receiver contact display frame shown in FIG. 12, if the software key B80 or the numeric key K0 is operated, the display frame shifts to the function selection display frame in the next rank of the hierarchy. As a result, a specific setting display frame for selecting a specific setting content for facsimile transmission is displayed as shown in FIG. 13. FIG. 13 is an illustration showing still another exemplary function setting display frame (specific setting display frame) for facsimile transmission operation in the universal mode. The specific setting operation for facsimile transmission displays ten selections: selection of color/monochrome corresponding to the software key B91 and the numeric key K1; selection of an original size corresponding to the software key B92 and the numeric key 2; selection of file format corresponding to the software key B93 and the numeric key K3; selection of a density corresponding to the software key B94 and the numeric key K4; selection of a side to be read (one side/opposite sides) of an original corresponding to the software key B95 and the numeric key K5; selection of a resolution corresponding to the software key B96 and the numeric key K6; selection of a transmission size unillustrated in FIG. 13 as is the case of FIG. 6 described above; selection of an image quality of an original; selection of scale up/down; and selection of a setting direction for an original. Further, in response to the software key B90 and the numeric key K0, it is possible to select the return to the transmission method selecting display frame or the registered receiver contact display frame shown in FIG. 12. FIG. 13 shows a state where the size of an original is selected immediately before shifting to the function selection display frame in the next rank of the hierarchy.

Figure 14:
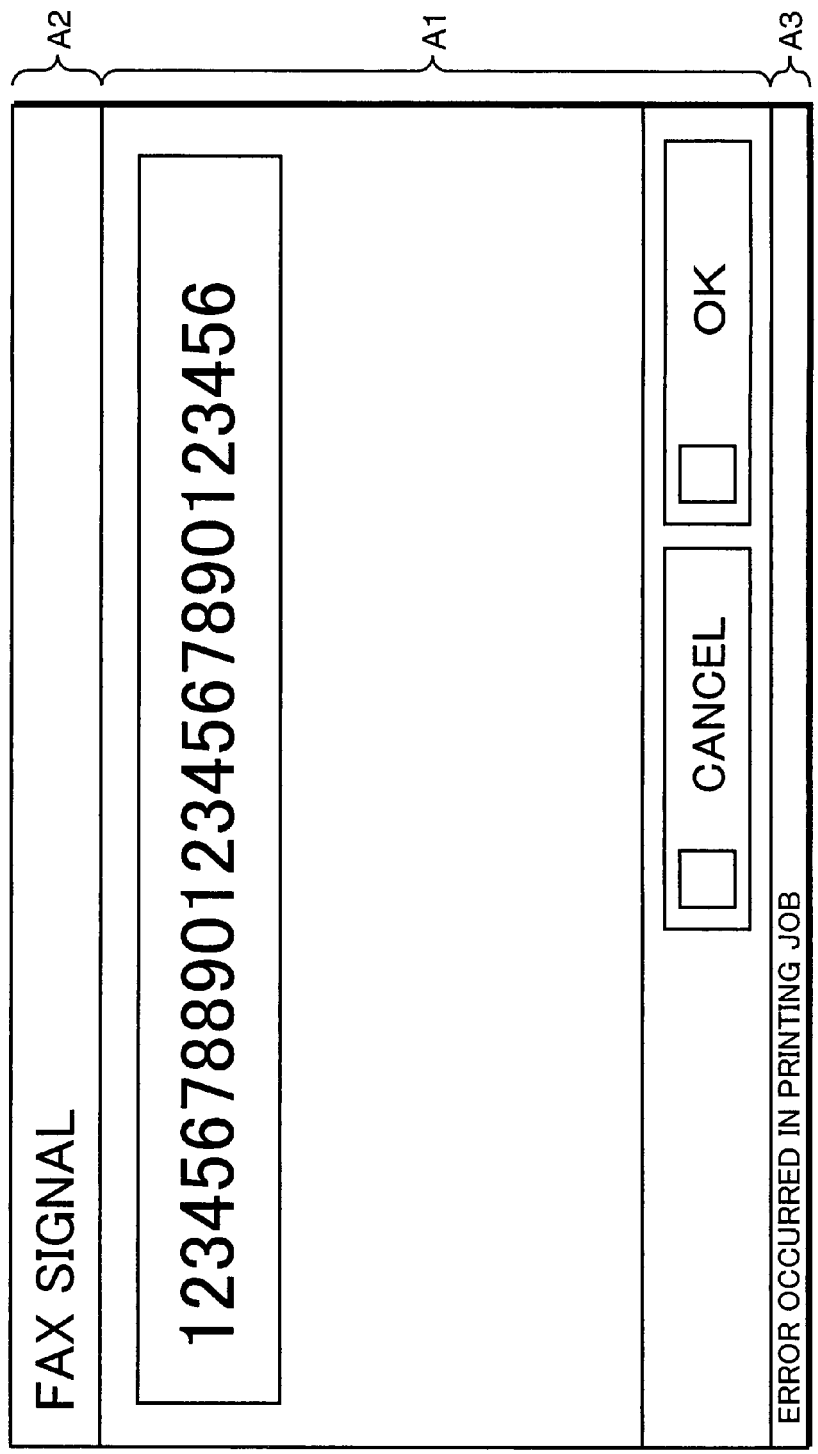
FIG. 14 is an illustration showing another exemplary function setting display frame for facsimile transmission operation in the universal mode.

In the function selection display frame shown in FIG. 10, when the software key B62 or the numeric key K2 is operated, the display frame shifts to a display frame in the next rank of the hierarchy. As a result, a number inputting display frame for directly inputting a facsimile number is displayed as shown in FIG. 14. FIG. 14 is an illustration showing another exemplary function setting display frame (number inputting display frame) for facsimile transmission operation in the universal mode.

If a transmission receiver is selected on the abbreviated numbers as shown in FIG. 11 and is fixed, the display frame shifts to the detail setting display frame shown in FIG. 13. Direct input of the facsimile number as shown in FIG. 14 selects a transmission receiver. If the transmission receiver is fixed, the display frame shifts to the detail setting display frame shown in FIG. 13.

Figure 15:
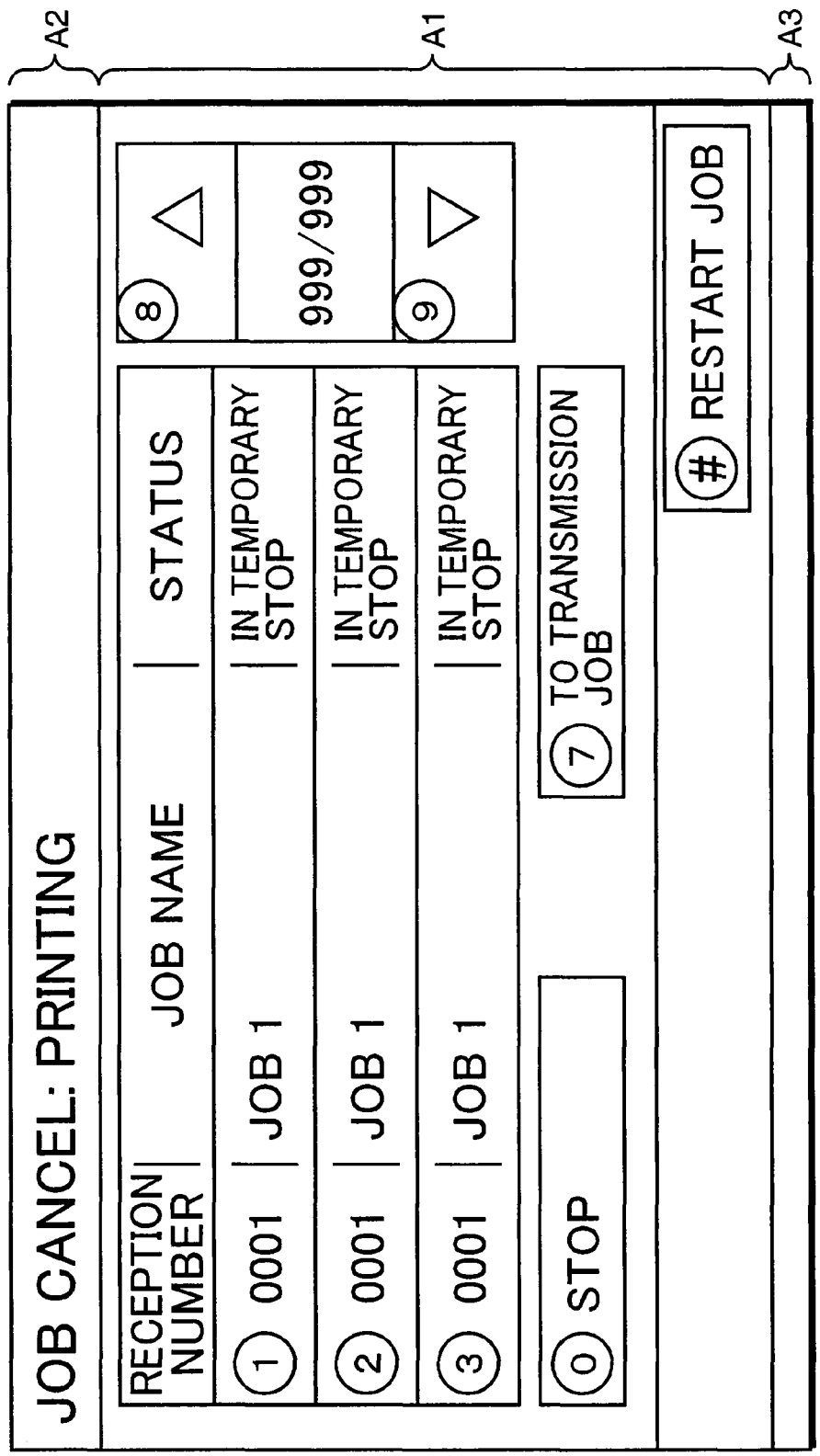
FIG. 15 is an illustration showing still another exemplary function setting display frame for facsimile transmission operation in the universal mode.

On the other hand, when the switch S15 for confirming the job is operated during when the function for facsimile transmission is selected shown in FIGS. 10 to 14 described above, the display frame shifts to the function selection display frame capable of confirming and canceling a job as shown in FIG. 15. FIG. 15 is an illustration showing still another exemplary function setting display frame for facsimile transmission operation in the universal mode.

As described above, in the composite machine 1 according to this embodiment, in the standard mode, the input controller 46 of the control section 41 controls the touch panel device P to display in the display area A1 to display a plural-function selection display frame including the function of setting the number of copies shown in FIG. 4, and receives selection of a function. When the standard mode is switched to the universal mode, first of all, the input controller 46 controls the copy number inputting display box H10 shown in FIG. 5 to appear in an enlarged size. At this time, the input controller 46 controls the display area A1 to erase all the displays of functions other than the set number of copies (except for the software key B10 for shifting to other function setting), and permits only the input of the number of copies. However, since the display frame is returnable to the initial reception frame shown in FIG. 4 by operating the reset switch S4, the software key B10 is not necessarily displayed. Therefore, the operation of setting the number of copies of which frequency of use is high can be easily made (easily viewed) on an enlarged display frame. In this manner, the setting operation becomes simple, and the composite machine 1 can be used even by a person who is not accustomed to operating the composite machine 1.

Further, in the universal mode, the input controller 46 of the control section 41 controls the display area A1 on the touch panel device P to appear in monochrome, and sets its contrast to be higher than that of the standard mode. Therefore, the visibility in the universal mode can be enhanced especially for the user having weak sight or color-blindness.

The display is not limited to the monochrome. Alternatively, the number of colors to be used may be reduced in the universal mode than the standard mode. However, in selecting the colors other than monochrome, colors that provide contrast higher than that of the standard mode are selected. On the other hand, the standard mode is not limited to full colors, but may be multiple colors or multiple tones which enable the user to obtain information also from the colors of display and are easy for the user to recognize.

The touch panel device P includes, on top of the display area A1 for displaying a plural-function setting display frame, another display area A3. The input controller 46 of the control section 41 controls the display area A3 to provide status information indicative of the status of the processing which is concurrently executed such as facsimile transmission or reception and the state of the device such as a troubled location or sheet lack. Therefore, in the universal mode, the enhanced operability is realized as well as important information is announced to the user.

Further, in the universal mode, the input controller 46 controls the display area A1 to provide the software keys given with the numbers or symbols corresponding to the collectively arranged keys K0 to K11. Then, the input controller 46 receives an input by the way of the individual keys K0 to K11 as an input of selected function corresponding to the input through the software key. In the standard mode, the input controller 46 receives inputs only through the software keys. Therefore, in the universal mode, the user is enabled to set a part or all the functions of the copying operation and facsimile transmission operation through the individual keys K0 to K11. As a result of this, the user who cannot cope with complicated operations can select a variety of functions by an operation easy to understand through the keys K0 to K11, and can also make such selection through the software keys as in the conventional manner. Further, the display area A1 exhibits selected functions for the keys K0 to K11 at the maximum. The individual selected functions can be displayed in an enlarged size to enhance the operability.

The standard mode is not limited to a conventional inputting manner widely and generally employed where the functions are selected only through the input from the touch panel device P without displaying the numbers or symbols as described above, but the inputting method may be properly determined. For example, as disclosed in Japanese Patent No. 3613410 and Japanese Unexamined Patent Publication No. SHO 62-272286, although the numbers or symbols are displayed, the individual selectable functions are concurrently displayed in a small size on the plural-hierarchy function selection display frame, and a desired function is specified by operating the keys K0 to K11 once or plural times (in the case of operations in plural times, numbers in two or more digits are specified).

Further, when an operation which is not supported by the universal mode and can be selected only in the standard mode is selected in the state of the copying operation and the facsimile transmission operation which can be selected in the universal mode, the input controller 46 controls the display area A1 to provide the confirmation (warning) display frame such as shown in FIG. 9. After confirming to the user that he or she accepts to cancel the universal mode, the input controller 46 changes the universal mode to the standard mode. This avoids a trouble that the universal mode is undesirably cancelled by an erroneous operation by the user. In the case where there is little likelihood of an erroneous operation, such as after the copying operation is finished or the selection of the function selection display frame in the lowermost rank of the hierarchy is finished, the universal mode may be directly returned to the standard mode without displaying the confirmation display frame shown in FIG. 9.

In the above description, although the switching from the standard mode into the universal mode is made by operating the switch S21 by the user, the present invention is not specifically limited thereto. Alternatively, the composite machine 1 may automatically determine the timing to switch into the universal model by communicating with an IC tag embedded in an identity card which each user carries with him, or detecting that a wheelchair approaches thereto, or detecting that a child approaches thereto, and may switch into the universal mode without requiring the operation by the user.

In summary, the embodiment described above mainly includes the following features.

The input operating device for use in an image forming apparatus includes: an input operating section for displaying a plurality of settable functions and receiving an input by the user among the plurality of functions; and a control section for switching an input mode by the input operating section between a standard mode capable of setting all the functions and a universal mode capable of setting some of the functions with recognition higher than the standard mode.

According to this construction, a plurality of settable functions are displayed, and the user's input is accepted through the function selected among the plurality of functions. Then, the input mode is switched by the input operating section between the standard mode in which all the function can be set and the universal mode in which limited functions can be set by providing recognition higher than that of the standard mode.

Since the input mode is switched between the standard mode and the universal mode, the operability for the user can be improved.

Preferably, in the input operating device described above, in the standard mode, the control section controls the input operating section to display in its display area a plurality of settable functions including a function of setting the number of copies, and receives the selection of a function, and in the universal mode, the control section controls the input operating section to initially display in its display area a function of setting the number of copies and receives an input of setting the number of copies.

According to this construction, the input operating device includes the input operating section including a liquid crystal panel and a touch panel provided in the liquid crystal panel, and a control section for controlling the input operating section to display and receiving inputs from the input operating section. The input mode in the input operating section is switchable between the standard mode for users capable of coping with complicated operations such as non-handicapped people and young and middle-aged peoples, and the universal mode for users incapable of coping with complicated operations such as handicapped people, children, and high-aged people. In the standard mode, the control section controls the input operating section to display a plurality of settable functions including the function of setting the print number of copies in the display area, and receives the selection by the input operating section. Contrarily, for example, if the user presses the switch button for switching into the universal mode, or if the image forming apparatus communicates with an IC tag embedded in an identity card that each user carries with him, or detects that a wheelchair approaches thereto, or detects that a child approaches thereto, the mode is switched into the universal mode. When the mode is switched into the universal mode, the control section controls the input operating section to initially display in an enlarged size in its display area the function of setting the number of copies of print, and receives the input of the set print number of copies.

Thus, when the mode is switched into the universal mode, the input display frame for setting the number of copies of print is initially displayed in an enlarged size. The operation of setting the number of copies of which frequency of use is high can be easily made (easily viewed) on the enlarged display frame, and the operability for the user can be improved.

Preferably, in the input operating device, in the standard mode, the control section controls the input operating section to display in its display area a plurality of settable functions including a function of setting the number of copies of print and receives the selection of the function, and when the standard mode is switched into the universal mode, the control section controls the input operating section to cancel functions other than the function of setting the number of copies of print and receives only an input of setting the number of copies of print.

According to this construction, the input operating device of the image forming apparatus includes the input operating section including a liquid crystal panel and a touch panel mounted on the liquid crystal panel, and a control section for controlling the input operating section to display and receiving inputs from the input operating section. The input mode in the input operating section is switchable between the standard mode for users capable of coping with complicated operations such as non-handicapped people and young and middle-aged people, and the universal mode for users incapable of coping with complicated operations such as handicapped people, children, and high-aged people. In the standard mode, the control section controls the input operating section to display in its display area a plurality of settable functions including the function of setting the number of copies of print, and receives the selection made through the input operating section. Contrarily, for example, if the user presses the switch button for switching into the universal mode, or if the image forming apparatus communicates with an IC tag embedded in an identity card that each user carries with him, or detects that a wheelchair approaches thereto, or detects that a child approaches thereto, the mode is switched into the universal mode. When the mode is switched into the universal mode, the control section controls the input operating section to cancel the display of all the functions other than the function of setting the number copies of print from the display area, and to display only the function of setting the number of copies of print which is currently set, and receives only the input of setting the number of copies of print.

Thus, when the standard mode is switched into the universal mode, the display of the functions other than the function of setting the number of copies are cancelled from the display area of the input control section, and only the function of setting the number of copies of print is displayed. As a result, the operation of setting the number of copies of print of which frequency of use is high can be easily made (easily viewed), and the operability for the user can be improved.

Preferably, in the input operating device, in the universal mode, the control section controls the input operating section to display settable functions in colors in the number smaller than the standard mode.

According to this construction, the input operating device includes the input operating section including a liquid crystal panel and a touch panel mounted on the liquid crystal panel, and a control section for controlling the input operating section to display and receiving inputs from the input operating section. The input mode in the input operating section is switchable between the standard mode for users capable of coping with complicated operations such as non-handicapped people and young and middle-aged people, and the universal mode for users incapable of coping with complicated operations such as handicapped people, children, high-aged people. In the standard mode, the control section controls the input operating section to display a display frame in multiple colors such as full colors or in a high number of gradations. In this manner, the user can obtain information also from the colors of display, and can easily recognize the contents of the display. On the other hand, in the universal mode, the control section controls the input operating section to display the functions settable in colors in the number smaller than the standard mode. In this manner, even the user having color-blindness or weak sight can obtain information regardless of the colors of the display. For example, if the user presses the switch button for switching into the universal mode, or if the image forming apparatus communicates with an IC tag embedded in an identity card that each user carries with him, or detects that a wheelchair approaches thereto, or detects that a child approaches thereto, the standard mode is switched into the universal mode.

Thus, when the standard mode is switched into the universal mode, the settable functions are displayed in colors in the number smaller than the standard mode. Thus, especially, the visibility for the people having color-blindness or weak sight can be improved and the operability for the user can be improved.

Preferably, the input operating device further includes a plurality of numeric input keys mutually collectively arranged, and in the universal mode, the control section controls the input operating section to display in its display area settable functions given with numbers or symbols within the number range of the numeric input keys and receives inputs from the input operating section and individual numeric input keys as inputs of the corresponding functions, and in the standard mode, the control section receives only an input from the input operating section without the display of the settable functions given with the numbers or symbols corresponding to the plurality of numeric input keys.

According to this construction, the input operating device includes an input operating section having a liquid crystal panel and a touch panel mounted on the liquid crystal panel, a plurality of numeric input keys collectively arranged, and a control section for controlling the input operating section to make display in the display area and receiving inputs from the input section of the input operating section. The plurality of numeric input keys include symbol keys on top of numeric keys as far as such symbol keys are collectively arranged in a group. The use of the numeric input keys enables the handicapped people, children, high-aged people who cannot cope with complicated operations to achieve input operations in the universal mode. In the universal mode, the control section controls the input operating section to display the numbers or symbols within the number range of the numeric input keys to each of the plurality of display frames displayed in a hierarchical form as if pages are turned in the state where such numbers or symbols are attached to the settable functions, and receives inputs from the input operating section and the individual numeric input keys as inputs of the corresponding function. On the other hand, in the standard mode, the control section receives only the input from the touch panel as in the conventional cases without attaching the number or symbols corresponding to a plurality of numeric input keys to the settable functions.

Thus, in the universal mode, some or all the functions can be set even from the numeric input keys located at positions different from the input device section. The user who cannot cope with complicated operations can select various functions through the operation easy to understand through the numeric input keys. Further, since the functions in the same number as the numeric input keys at the maximum are displayed in the display area, the individual settable functions can be displayed in an enlarged size, thereby improving the operability.

Preferably, in the input operating device, in the universal mode, the control section controls the input operating section to display in its display area a plurality of functions related to a copying operation given with numbers or symbols of the plurality of numeric input keys.

According to this construction, in the universal mode, the control section controls the input operating section to display the numbers or symbols within the number range of the numeric input keys to each of the plurality of display frames displayed in a hierarchical form as if pages are turned in the state where such numbers or symbols are attached to the functions related to the copying operation, and receives inputs from the input operating section and the individual numeric input keys as inputs of the corresponding function.

Thus, in the universal mode, the functions related to the copying operation can be set even from the numeric input keys located at positions different from the input device section. The user who cannot cope with complicated operations can select various functions through the operation easy to understand through the numeric input keys.

Preferably, in the input operating device, in the universal mode, the control section controls the input operating section to display in its display area a plurality of functions related to a facsimile transmission operation given with numbers or symbols of the plurality of numeric input keys.

According to this construction, in the universal mode, the control section controls the input operating section to display the numbers or symbols within the number range of the numeric input keys to each of the plurality of display frames displayed in a hierarchical form as if pages are turned in the state where such numbers or symbols are attached to the functions related to the facsimile transmission operation, and receives inputs from the input operating section and the individual numeric input keys as inputs of the corresponding function.

Thus, in the universal mode, the functions related to the facsimile transmission operation can be set even from the numeric input keys located at positions different from the input device section. The user who cannot cope with complicated operations can select various functions through the operation easy to understand through the numeric input keys.

Preferably, the input operating device further includes a plurality of numeric input keys mutually collectively arranged, and in the universal mode, the control section controls the input operating section to display in its display area settable functions on one display frame given with numbers or symbols within the number range of the plurality of numeric input keys.

According to this construction, the input operating device includes a display section having a liquid crystal panel, a plurality of numeric input keys collectively arranged, and a control section for controlling the input operating section to display settable functions given with the numbers or symbols which can be inputted from the numeric input keys and for receiving the inputs from the individual numeric input keys as the inputs from the corresponding functions. The plurality of numeric input keys includes symbol keys on top of numeric keys as far as such symbol keys are collectively arranged in a group. In realizing the input operations in the universal mode for the handicapped people, children, high-aged people who cannot cope with complicated operations, the control section controls the input operating section to display the numbers or symbols within the number range of the numeric input keys to each of the settable functions displayed in one display frame in the state where such numbers or symbols are attached to the settable functions.

Therefore, in the case of selecting a function using a numeric input key in the universal mode, the settable functions are displayed on the individual display frames within the range of the number which does not exceed the number of the numeric input keys. In this manner, for example, the settable functions are displayed only within the range of the twelve numeric input keys including the ten numeric keys "0" to "9" and the two symbol keys "#" and "*". The plurality of the numeric input keys are independently corresponded to the functions settable on the individual display frames, and the plurality of the numeric keys and the symbol keys are never combined when they are corresponded to the settable functions. For this reason, the keys can be easily operated and the individual settable keys can be displayed in an enlarged size, thereby improving the operability for the user.

Preferably, in the input operating device, in the universal mode, the control section controls the input operating section to display in its display area a plurality of functions related to a copying operation on one display frame given with numbers or symbols within the number range of the numeric input keys.

According to this construction, in realizing the input operation in the universal mode, the control section controls the input operating section to display the plurality of functions related to the copying operation on one display frame in a state where the functions are given with the numbers or symbols within the number range of the numeric input keys.

Therefore, in the case of selecting a function using a numeric input key in the universal mode, the functions related to the copying operation are displayed on the individual display frames within the ranges of the number which does not exceed the number of the numeric input keys. For this reason, the keys can be easily operated and the individual functions related to the copying operation can be displayed in an enlarged size, thereby improving the operability for the user.

Preferably, in the input operating device, in the universal mode, the control section controls the input operating section to display in its display area a plurality of functions related to a facsimile transmission operation on one display frame given with numbers or symbols within the number range of the numeric input keys.

According to this construction, in realizing the input operation in the universal mode, the control section controls the input operating section to display the plurality of functions related to the facsimile transmission operation on one display frame in a state where the functions are given with the numbers or symbols corresponding to the plurality of numeric input keys.

Therefore, in the case of selecting a function using a numeric input key in the universal mode, the functions related to the facsimile transmission operation are displayed on the individual display frames within the ranges of the number which does not exceed the number of the numeric input keys. For this reason, the keys can be easily operated and the plurality of functions related to the facsimile transmission operation can be displayed in an enlarged size, thereby improving the operability for the user.

Preferably, in the input operating device, in the universal mode, if an operation of inputting a function which is not supported by the universal mode is executed, the control section releases the universal mode to return it to the standard mode.

According to this construction, the input operating device includes the input operating section including a liquid crystal panel and a touch panel mounted on the liquid crystal panel, and a control section for controlling the input operating section to display and receiving inputs from the input operating section. The input mode in the input operating section is switchable between the standard mode for users capable of coping with complicated operations such as non-handicapped people and young and middle-aged people, and the universal mode for users incapable of coping with complicated operations such as handicapped people, children, and high-aged people. In the universal mode, when the user desires to set the function which is not supported by the universal mode, that is, the function which is settable only in the standard mode, and executes the input operation for such a function through the input operating section or another input section, the control section changes from the universal mode to the standard mode. For example, if the user presses the switch button for switching into the universal mode, or if the image forming apparatus communicates with an IC tag embedded in an identity card that each user carries with him, or detects that a wheelchair approaches thereto, or detects that a child approaches thereto, the control section switches the mode from the standard mode into the into the universal mode.

Thus, without the need of switching operation into the standard mode by the user, the mode is automatically returned to the standard mode if necessary. As is intended by the universal mode, the input operation can be facilitated and the operability by the operator can be improved.

Preferably, in the input operating device, in the standard mode, functions related to a copying operation, a facsimile transmission operation, a printing operation, and a scanning operation can be set, and in the universal mode, functions related only to the copying operation and the facsimile transmission operation can be set, and in the universal mode for the copying operation or the facsimile transmission operation, if an input operation for switching the operation into the printing operation or the scanning operation is made, the control section changes from the universal mode to the standard mode, and controls the input operating section to display in its display area settable functions related to the printing operation or the scanning operation.

According to this construction, in the universal mode for the copying operation or the facsimile transmission operation, if an input operation is executed for switching the operation into the printing operation or the scanning operation, the universal mode is changed to the standard mode. Then, the settable functions related to the printing operation or the scanning operation is displayed in the display area of the input operating section.

Therefore, in the universal mode for the copying operation or the facsimile transmission operation, if the input operation is executed for switching the operation into the printing operation or the scanning operation without switching the mode into the standard mode by the user, the mode automatically returns to the standard mode. Therefore, as is intended by the universal mode, the input operation can be facilitated and the operability for the operator can be improved.

Preferably, in the input operating device, if a function which is not supported by the universal mode is inputted through the input operating section, the control section controls the input operating section to display a display frame for inquiring whether or not the user accepts the switching of the universal mode to the standard mode, and if the user makes an operation for accepting the switching, the control section changes from the universal mode to the standard mode.

According to this construction, when it is needed to switch from the universal mode to the standard mode, the mode is not automatically switched. Instead, a display frame for inquiring to the user that he or she accepts the standard mode, and the mode switches to the standard mode after the user executes an operation to accept the standard mode. Therefore, a trouble is avoided that the universal mode is undesirably released by an erroneous operation by the user.

Preferably, in the input operating device, in the standard mode, functions related to a copying operation, a facsimile transmission operation, a printing operation, and a scanning operation can be set, and in the universal mode, functions related only to the copying operation and the facsimile transmission operation can be set, and in the universal mode for the copying operation or the facsimile transmission operation, if an input operation for switching the operation to the printing operation or the scanning operation is made, the control section controls the input operating section to display in its the display area the inquiring display frame.

According to this construction, in the universal mode for the copying operation or the facsimile transmission operation, if an input operation is executed for switching the operation to the printing operation or the scanning operation, the universal mode is not automatically switched to the standard mode. Instead, a display frame for inquiring to the user that he or she accepts the standard mode, and the mode switches to the standard mode after the user executes an operation for accepting the standard mode. Therefore, a trouble is avoided that the universal mode is undesirably cancelled by an erroneous operation by the user to accidentally switch the operation to the printing operation or the scanning operation.

Preferably, in the input operating device, in the universal mode, the control section controls the input operating section to make display in its display area in monochrome and in contrast higher than contrast of the standard mode.

According to this construction, in the universal mode, the display area of the input operating section is in monochrome and in contrast higher than that of the standard mode. Thus, especially, the visibility for the people having color-blindness or weak sight can be improved and the operability for the user can be improved.

Preferably, in the input operating device, the input operating section includes a plurality of display areas, and regardless of the mode, the control section controls the input operating section to display status information in its display area other than the display areas in which a plurality of settable functions are displayed.

According to this construction, the input operating section includes a plurality of display areas and the display mode is switched between the standard mode and the universal mode. The input operating section includes a display area for displaying a plurality of settable functions as well as other display areas. The control section controls the other areas to display the status information indicative of the processing concurrently executed such as the facsimile transmission or reception and the state of the device such as a troubled location or empty of papers.

Therefore, in the universal mode, the enhanced operability is realized as well as announcing important information to the user.

The image forming apparatus includes the aforementioned input operating device. This construction makes it possible to produce an image forming apparatus capable of improving the operability for the user.

This application is based on patent application Nos. 2006-52145, 2006-52146, 2006-52147, 2006-52148, and 2006-52149 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An input operating device for use in an image forming apparatus, comprising:
    an input operating section for displaying a plurality of settable functions, and receiving an input of a function by a user;
    a control section for switching over a standard mode of allowing all of the functions to be set and a universal mode of allowing a part of the functions with recognition higher than the standard mode; and
    a plurality of numeric input keys that are arranged collectively, wherein
    in the standard mode, the control section controls the input operating section to display in a display area thereof a plurality of settable functions including a function of setting the number of copies of print to receive a selection of a function, and in the universal mode, the control section controls the input operating section to provide an enlarged display at an initial stage in the display area thereof a function of setting the number of copies of print, from among the plurality of settable functions, to receive an input of setting the number of copies of print, at the initial stage of the universal mode, the control section controls the input operating section to display a set number inputting display frame consisting of a set number display area where only the number of copies set in the setting of the number of copies of print is displayed in an enlarged size, and a function setting switch button for switching the set number inputting display frame to a function setting display frame for setting a plurality of other functions relating to a copying operation including setting of a sheet size, setting of a scale of a scanned image of an original, setting of a print density, setting of a print side of a sheet to be printed, and setting of whether to collect scanned images of originals, the plurality of numeric input keys include numeric keys corresponding to numerals "0" to "9" and symbol keys corresponding to symbols "#" and "*", the numeric keys and the symbol keys being located at positions different from the display area of the input operating section, the set number inputting display frame allows an input of the number of copies of print by use of the numeric input keys, the set number inputting display frame allows an input of the function setting switch button by use of the symbol keys, the control section switches the set number inputting display frame to the function setting display frame when a symbol key associated with the function setting switch button is input, the function setting display frame includes setting items for setting the plurality of functions other than the setting of the number of copies of print relating to the copying operation and a number setting switch button for switching the function setting display frame to the set number inputting display frame, the function setting display frame allows both an input of a setting item and an input of the number setting switch button by use of a numeric input key, and the control section switches the function setting display frame to the set number inputting display frame when a numeric input key associated with the number setting switch button is input, in the universal mode, the control section controls the input operating section to display in a display frame of the display area functions with the corresponding numbers or symbols of the plurality of numeric input keys, and correlates the plurality of numeric input keys with the settable functions in each of the display frames respectively individually to display the settable functions in the function setting display frames by the number not larger than the number of the plurality of numeric input keys, and in the universal mode, in the case where a numeric input key corresponding to a function intended by the user is pressed, out of a plurality of functions displayed in a screen, the control section attaches, to a setting item for performing a setting on the function correlated with the pressed numeric input key, a number or a symbol correlated in a range of the plurality of numeric input keys to control the input operating section to display the setting item attached with the number or the symbol.

2. The input operating device according to claim 1, wherein, in the standard mode, the control section controls the input operating section to display in the display area a plurality of settable functions including a function of setting the number of copies of print to receive a selection of a function, and when the standard mode is switched to the universal mode, the control section controls the input operating section to display in the display area the function of setting the number of copies of print without the display of the other functions to receive only an input of setting the number of copies of print.

3. The input operating device according to claim 1, wherein, in the universal mode, the control section controls the input operating section to display settable functions in a smaller number of colors than the standard mode.

4. The input operating device according to claim 1, further comprising a plurality of numeric input keys which are collectively arranged, wherein in the universal mode, the control section controls the input operating section to display in the display area settable functions given with numbers or symbols of the plurality of numeric input keys to receive from the input operating section and individual numeric input keys an input of corresponding functions, and in the standard mode, the control section receives an input only from the input operating section without the display of the settable functions given with the numbers or symbols of the plurality of numeric input keys.

5. The input operating device according to claim 4, wherein in the universal mode, the control section controls the input operating section to display in the display area a plurality of functions related to copying operation given with numbers or symbols of the plurality of numeric input keys.

6. The input operating device according to claim 4, wherein in the universal mode, the control section controls the input operating section to display in the display area a plurality of functions related to facsimile transmission operation given with numbers or symbols of the plurality of numeric input keys.

7. The input operating device according to claim 1, wherein in the universal mode, the control section controls the input operating section to display in a display frame of the display area a plurality of functions related to copying operation with corresponding numbers or symbols of the plurality of numeric input keys.

8. The input operating device according to claim 1, wherein in the universal mode, the control section controls the input operating section to display in the display area a plurality of functions related to facsimile transmission operation with corresponding numbers or symbols of the plurality of numeric input keys.

9. The input operating device according to claim 1, wherein if an input of a function which is not supported by the universal mode is executed in the universal mode, the control section changes the universal mode to the standard mode.

10. The input operating device according to claim 9,
wherein the settable functions in the standard mode include functions related to copying operation, facsimile transmission operation, printing operation, and scanning operation, and the settable functions in the universal mode include functions related only to the copying operation and the facsimile transmission operation, and wherein if a function related to a printing operation or a scanning operation is input in the universal mode, the control section changes the universal mode to the standard mode to display in the display area settable functions related to the printing operation or the scanning operation.

11. The input operating device according to claim 9, wherein if a function which is not supported by the universal mode is inputted through the input operating section, the control section controls the input operating section to display an image frame for inquiring whether or not the user accepts the changing of the universal mode to the standard mode, and changes the universal mode to the standard mode if the user executes an acceptance.

12. The input operating device according to claim 11, wherein the settable functions in the standard mode include functions related to copying operation, facsimile transmission operation, printing operation, and scanning operation, and the settable functions in the universal mode includes functions related only to the copying operation and the facsimile transmission operation, and wherein if a function related to a printing operation or a scanning operation is inputted in the universal mode, the control section controls the input operating section to display in the display area the inquiring image frame.

13. The input operating device according to claim 1, wherein in the universal mode, the control section controls the input operating section to display in the display area in monochrome and in contrast higher than the standard mode.

14. The input operating device according to claim 1, wherein the input operating section includes a plurality of display areas, and the control section controls the input operating section to display status information in a display area other than the display area in which the plurality of settable functions are displayed.

15. An image forming apparatus including the input operating device according to claim 1.

* * * * *